United States Patent
Suzuki et al.

(10) Patent No.: US 9,699,423 B2
(45) Date of Patent: Jul. 4, 2017

(54) PROJECTOR AND CONTROL METHOD FOR PROJECTOR

(71) Applicant: SEIKO EPSON CORPORATION, Tokyo (JP)

(72) Inventors: Junichi Suzuki, Matsumoto (JP); Toru Terashima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 11 days.

(21) Appl. No.: 15/052,006

(22) Filed: Feb. 24, 2016

(65) Prior Publication Data
US 2016/0261833 A1    Sep. 8, 2016

(30) Foreign Application Priority Data

Mar. 4, 2015  (JP) ................. 2015-042885
Mar. 4, 2015  (JP) ................. 2015-042886

(51) Int. Cl.
| | |
|---|---|
| *H04N 9/31* | (2006.01) |
| *H05B 41/36* | (2006.01) |
| *H05B 41/282* | (2006.01) |
| *H05B 37/02* | (2006.01) |
| *G03B 21/20* | (2006.01) |

(52) U.S. Cl.
CPC ....... *H04N 9/3155* (2013.01); *G03B 21/2026* (2013.01); *H04N 9/3144* (2013.01); *H05B 37/02* (2013.01); *H05B 41/2828* (2013.01); *H05B 41/36* (2013.01); *Y02B 20/186* (2013.01)

(58) Field of Classification Search
CPC ............. G03B 21/14; G03B 21/2026; G03B 21/2053; G03B 21/206; H04N 9/3155; H05B 37/02; H05B 41/36; G09G 3/3406
See application file for complete search history.

(56) References Cited

U.S. PATENT DOCUMENTS 8,317,339 B2 * 11/2012 Takezawa .......... H05B 41/2887
                                                                  250/205
8,783,876 B2 *  7/2014 Terashima ......... G03B 21/2053
                                                                  315/208
(Continued)

FOREIGN PATENT DOCUMENTS

JP    2002-289379 A    10/2002
JP    2003-031387 A     1/2003
(Continued)

*Primary Examiner* — William C Dowling
(74) *Attorney, Agent, or Firm* — Oliff PLC

(57) ABSTRACT

In a projector, a reflection mirror configured to reflect light emitted from a discharge lamp is disposed on a first end of a discharge lamp main body, a first electrode is disposed on the first end side, each of a first AC period and a second AC period alternately includes a first polarity period in which the first electrode serves as an anode and a second polarity period in which a second electrode serves as an anode, a controller causes a period to transition from the first AC period to the second AC period in a case where an input reception unit receives a stop operation on the projector, and an absolute value of a driving current of the second polarity period in the second AC period is greater than an absolute value of the driving current of the second polarity period in the first AC period.

20 Claims, 12 Drawing Sheets

(56) References Cited

U.S. PATENT DOCUMENTS

| | | | |
|---|---|---|---|
| 8,988,006 B2* | 3/2015 | Terashima | G03B 21/2026 |
| | | | 315/246 |
| 9,338,416 B2* | 5/2016 | Suzuki | G03B 21/005 |
| 9,354,497 B2* | 5/2016 | Terashima | G03B 21/2053 |
| 9,398,275 B2* | 7/2016 | Suzuki | G03B 21/005 |
| 9,405,179 B2* | 8/2016 | Terashima | G03B 21/2026 |
| 9,509,965 B2* | 11/2016 | Nakagomi | H04N 9/3155 |
| 9,532,439 B2* | 12/2016 | Nakagomi | H05B 41/3927 |
| 9,563,111 B2* | 2/2017 | Nakagomi | G03B 21/2026 |
| 9,635,326 B2* | 4/2017 | Sato | H04N 9/3155 |
| 2002/0135324 A1 | 9/2002 | Fujii et al. | |
| 2003/0011320 A1 | 1/2003 | Okamoto et al. | |
| 2005/0093474 A1 | 5/2005 | Nishita | |
| 2007/0126371 A1 | 6/2007 | Brates et al. | |
| 2007/0159445 A1 | 7/2007 | Nakagawa et al. | |
| 2014/0104584 A1 | 4/2014 | Kado et al. | |

FOREIGN PATENT DOCUMENTS

| | | |
|---|---|---|
| JP | 2004-342357 A | 12/2004 |
| JP | 2005-166593 A | 6/2005 |
| JP | 3852307 B2 | 11/2006 |
| JP | 2007-149408 A | 6/2007 |
| JP | 2007-157721 A | 6/2007 |
| JP | 4070420 B2 | 4/2008 |
| JP | 4273834 B2 | 6/2009 |
| JP | 4440614 B2 | 3/2010 |
| JP | 4810994 B2 | 11/2011 |
| JP | 4981424 B2 | 7/2012 |
| JP | 2014-081547 A | 5/2014 |

\* cited by examiner

PROJECTOR AND CONTROL METHOD FOR PROJECTOR

CROSS-REFERENCE

This application is based upon and claims the benefit of priority from Japanese Patent Application Nos. 2015-042885 and 2015-042886, both filed Mar. 4, 2015; the entire contents of which are incorporated herein by reference.

BACKGROUND

1. Technical Field

The present invention relates to a projector, and a control method for the projector.

2. Related Art

If an operation of a projector is stopped, the temperature of a discharge lamp provided in the projector decreases. Thus, mercury enclosed in the discharge lamp may condense and may be attached to an inner wall or electrodes of the discharge lamp. At this time, a mercury bridge may be generated as a result of the electrodes being connected to each other via mercury. If the mercury bridge is generated, the electrodes are short-circuited to each other, and thus the discharge lamp cannot be lighted.

In relation to this problem, Japanese Patent No. 4070420 discloses a method in which, in order to prevent a mercury bridge, lamp power supplied to electrodes is reduced to the extent to which arc discharge does not disappear in a state in which a discharge lamp transitions from a lighting state to a put-out state, and thus a light emitting tube portion is cooled to the extent to which mercury condenses.

However, in the above-described method, there is a problem in that time is required to cool the light emitting tube portion to the extent to which mercury condenses. For this reason, even if a user performs a stop operation on the projector, the projector continuously performs lighting at low power during that time, and thus there is a problem in that convenience of the projector is reduced.

SUMMARY

An advantage of some aspects of the invention is to provide a projector having a configuration capable of minimizing a mercury bridge and minimizing deterioration in convenience, and a control method for the projector.

A projector according to one aspect of the invention includes a discharge lamp configured to emit light; a reflection mirror configured to reflect the light emitted from the discharge lamp in a predetermined direction; a discharge lamp driving unit configured to supply a driving current to the discharge lamp; a controller configured to control the discharge lamp driving unit; an input reception unit configured to receive a predetermined operation; a light modulation device configured to modulation the light emitted from the discharge lamp according to an image signal; and a projection optical device configured to project light modulated by the light modulation device in which the discharge lamp includes a discharge lamp main body that has a discharge space therein; and a first electrode and a second electrode that protrude in the discharge space, in which the reflection mirror is attached to a first end of the discharge lamp main body, in which the first electrode is disposed on the first end side, the second electrode is disposed on a second end side of the discharge lamp main body opposite to the first end, the driving current includes a first AC period and a second AC period in which an alternating current is supplied to the discharge lamp, and each of the first AC period and the second AC period alternately includes a first polarity period in which the first electrode serves as an anode and a second polarity period in which the second electrode serves as an anode. In a case where the input reception unit receives a stop operation on the projector, the controller causes a period in which an alternating current is supplied to the discharge lamp to transition from the first AC period to the second AC period, and an absolute value of the driving current of the second polarity period in the second AC period is greater than an absolute value of the driving current of the second polarity period in the first AC period.

According to the projector according to the aspect of the invention, an absolute value of the driving current of the second polarity period in the second AC period is greater than an absolute value of the driving current of the second polarity period in the first AC period. For this reason, it is possible to heat the second electrode in the second AC period and thus to increase the temperature of the second electrode. Consequently, it is possible to lengthen a time period until the temperature of the second electrode becomes lower than the temperature of the discharge lamp main body after the discharge lamp is put out. As a result, the temperature of the discharge lamp main body is likely to become lower than the boiling point of mercury before the temperature of the second electrode becomes lower than the temperature of the discharge lamp main body. Therefore, mercury is likely to condense on an inner wall of the discharge lamp main body, and thus it is possible to minimize the generation of a mercury bridge.

If an absolute value of the driving current of the second polarity period in the second AC period is increased, it is possible to make the temperature of the second electrode high in a relatively short time period. Therefore, it is possible to put out the discharge lamp in a relatively short time period after the input reception unit receives a stop operation. Consequently, it is possible to minimize deterioration in convenience of the projector.

As mentioned above, according to the projector according to the aspect of the invention, it is possible to provide the projector having a configuration capable of minimizing a mercury bridge and of minimizing deterioration in convenience.

A projector according to one aspect of the invention includes a discharge lamp configured to emit light; a reflection mirror configured to reflect the light emitted from the discharge lamp in a predetermined direction; a discharge lamp driving unit configured to supply a driving current to the discharge lamp; a controller configured to control the discharge lamp driving unit; an input reception unit configured to receive a predetermined operation; a light modulation device configured to modulate the light emitted from the discharge lamp according to an image signal; and a projection optical device configured to project light modulated by the light modulation device, in which the discharge lamp includes a discharge lamp main body that has a discharge space therein; and a first electrode and a second electrode that protrude in the discharge space, the reflection mirror is attached to a first end of the discharge lamp main body, the first electrode is disposed on the first end side, the second electrode is disposed on a second end side of the discharge lamp main body opposite to the first end, the driving current includes a first AC period and a second AC period in which an alternating current is supplied to the discharge lamp, and each of the first AC period and the second AC period alternately includes a first polarity period in which the first electrode serves as an anode and a second polarity period in which the second electrode serves as an anode. In a case where the input reception unit receives a stop operation on the projector, the controller causes a period in which an alternating current is supplied to the discharge lamp to transition from the first AC period to the second AC period, and a length of the second polarity period in the second AC period is larger than a length of the first polarity period in the second AC period.

According to the projector according to the aspect of the invention, a length of the second polarity period in the second AC period is larger than a length of the first polarity period in the second AC period. For this reason, it is possible to heat the second electrode in the second AC period and thus to increase the temperature of the second electrode. Consequently, it is possible to lengthen a time period until the temperature of the second electrode becomes lower than the temperature of the discharge lamp main body after the discharge lamp is put out. As a result, the temperature of the discharge lamp main body is likely to become lower than the boiling point of mercury before the temperature of the second electrode becomes lower than the temperature of the discharge lamp main body. Therefore, mercury is likely to condense on an inner wall of the discharge lamp main body, and thus it is possible to minimize the generation of a mercury bridge.

According to the projector according to the aspect of the invention, it is possible to make the temperature of the second electrode high in a relatively short time period in the second AC period. Therefore, it is possible to stop an operation of the projector in a relatively short time period after the input reception unit receives a stop operation. Consequently, it is possible to minimize deterioration in convenience of the projector.

As mentioned above, according to the projector according to the aspect of the invention, it is possible to provide the projector having a configuration capable of minimizing a mercury bridge and of minimizing deterioration in convenience.

The aspect of the invention may be configured such that the length of the second AC period is 5.0 ms or more and 10 s or less.

According to the configuration, it is possible to appropriately heat the second electrode in the second AC period and also to minimize deterioration in convenience of the projector.

The aspect of the invention may be configured such that the absolute value of the driving current of the second polarity period in the second AC period is 0.8 times or greater and 1.25 times or smaller than an absolute value of the driving current obtained when rating power is supplied to the discharge lamp.

According to the configuration, it is possible to easily heat the second electrode in a short time period.

The aspect of the invention may be configured such that the stop operation includes a first stop operation and a second stop operation which is performed temporally later than the first stop operation, and the second AC period is provided in at least a partial period between the first stop operation and the second stop operation.

According to the configuration, since an operation of the projector can be stopped right after a user performs the second stop operation, it is possible to further minimize deterioration in convenience of the projector.

The aspect of the invention may be configured such that, in a case where the input reception unit receives the first stop operation, the controller performs a checking operation for checking whether or not operation stoppage of the projector is necessary.

According to the configuration, it is possible to prevent a user from wrongly stop an operation of the projector.

The aspect of the invention may be configured such that, in a case where the input reception unit receives the second stop operation, the controller controls the discharge lamp driving unit to stop the supply of the driving current to the discharge lamp.

According to the configuration, it is possible to minimize deterioration in convenience of the projector.

The aspect of the invention may be configured such that the projector further includes a cooling unit configured to cool the discharge lamp, and the controller, in the first AC period, drives the cooling unit with an first output which is set according to driving power supplied to the discharge lamp, and in at least a part of the second AC period, drives the cooling unit with a second output which is more than the first output.

According to the configuration, it is possible to further minimize the generation of a mercury bridge.

The aspect of the invention may be configured such that the projector further includes a cooling unit configured to cool the reflection mirror, and the controller, in the first AC period, drives the cooling unit with an first output which is set according to driving power supplied to the discharge lamp, and in at least a part of the second AC period, drives the cooling unit with a second output which is more than the first output.

According to the configuration, it is possible to further minimize the generation of a mercury bridge.

The aspect of the invention may be configured such that an absolute value of the driving current of the first polarity period in the second AC period is smaller than an absolute value of the driving current of the first polarity period in the first AC period.

According to the configuration, it is possible to increase the temperature of only the second electrode of the first electrode and the second electrode, and also to minimize the occurrence of flickering in the discharge lamp by preventing an increase in an average power amount in the second AC period relative to an average power amount in the first AC period.

The aspect of the invention may be configured such that a mean value of driving power supplied to the discharge lamp in the second AC period is the same as a value of driving power supplied to the discharge lamp in the first AC period.

According to the configuration, it is possible to minimize the occurrence of flickering in the discharge lamp.

The aspect of the invention may be configured such that a frequency of the driving current in the second AC period is higher than a frequency of the driving current in the first AC period.

According to the configuration, a length of the second polarity period in one cycle of the driving current of the second AC period can be made smaller than a length of the second polarity period in one cycle of the driving current of the first AC period. For this reason, it is possible to prevent a protrusion at a tip of the second electrode from being considerably melted and deformed due to an increase in an absolute value of the driving current in the second AC period. Consequently, it is possible to stably and easily increase the temperature of the second electrode in the second AC period.

A control method for a projector according to one aspect of the invention, the projector including a discharge lamp configured to emit light, a reflection mirror configured to reflect the light emitted from the discharge lamp, and an input reception unit configured to receive a predetermined operation, the discharge lamp having a discharge lamp main body that has a discharge space therein, and a first electrode and a second electrode that protrude in the discharge space, the reflection mirror being attached to a first end of the discharge lamp main body, the first electrode being disposed on the first end side, and the second electrode being disposed on a second end side of the discharge lamp main body opposite to the first end, the control method includes supplying a driving current including a first AC period and a second AC period in which an alternating current is supplied to the discharge lamp and which alternately include a first polarity period in which the first electrode serves as an anode and a second polarity period in which the second electrode serves as an anode respectively. In a case where the input reception unit receives a stop operation on the projector, performing transition of a period in which an alternating current is supplied to the discharge lamp from the first AC period to the second AC period, and an absolute value of the driving current of the second polarity period in the second AC period is greater than an absolute value of the driving current of the second polarity period in the first AC period.

According to the control method for the projector according to the aspect of the invention, it is possible to provide the projector having a configuration capable of minimizing a mercury bridge and of minimizing deterioration in convenience in the same manner as described above.

A control method for a projector according to one aspect of the invention, the projector including a discharge lamp configured to emit light, a reflection mirror configured to reflect the light emitted from the discharge lamp, and an input reception unit configured to receive a predetermined operation, the discharge lamp having a discharge lamp main body that has a discharge space therein, and a first electrode and a second electrode that protrude in the discharge space, the reflection mirror being attached to a first end of the discharge lamp main body, the first electrode being disposed on the first end side, and the second electrode being disposed on a second end side of the discharge lamp main body opposite to the first end, the control method includes supplying a driving current including a first AC period and a second AC period in which an alternating current is supplied to the discharge lamp and which alternately include a first polarity period in which the first electrode serves as an anode and a second polarity period in which the second electrode serves as an anode respectively. In a case where the input reception unit receives a stop operation on the projector, performing transition of a period in which an alternating current is supplied to the discharge lamp from the first AC period to the second AC period, and a length of the second polarity period in the second AC period is larger than a length of the first polarity period in the second AC period.

According to the control method for the projector according to the aspect of the invention, it is possible to provide the projector having a configuration capable of minimizing a mercury bridge and of minimizing deterioration in convenience in the same manner as described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, with reference to the drawings, a projector according to embodiments of the invention will be described.

The scope of the invention is not limited to the following embodiments, and can be arbitrarily changed within the scope of the technical spirit of the invention. In the following drawings, for better understanding of each constituent element, a scale, the number, and the like thereof in each structure may be different from a scale, the number, and the like thereof in an actual structure.

First Embodiment

Figure 1:
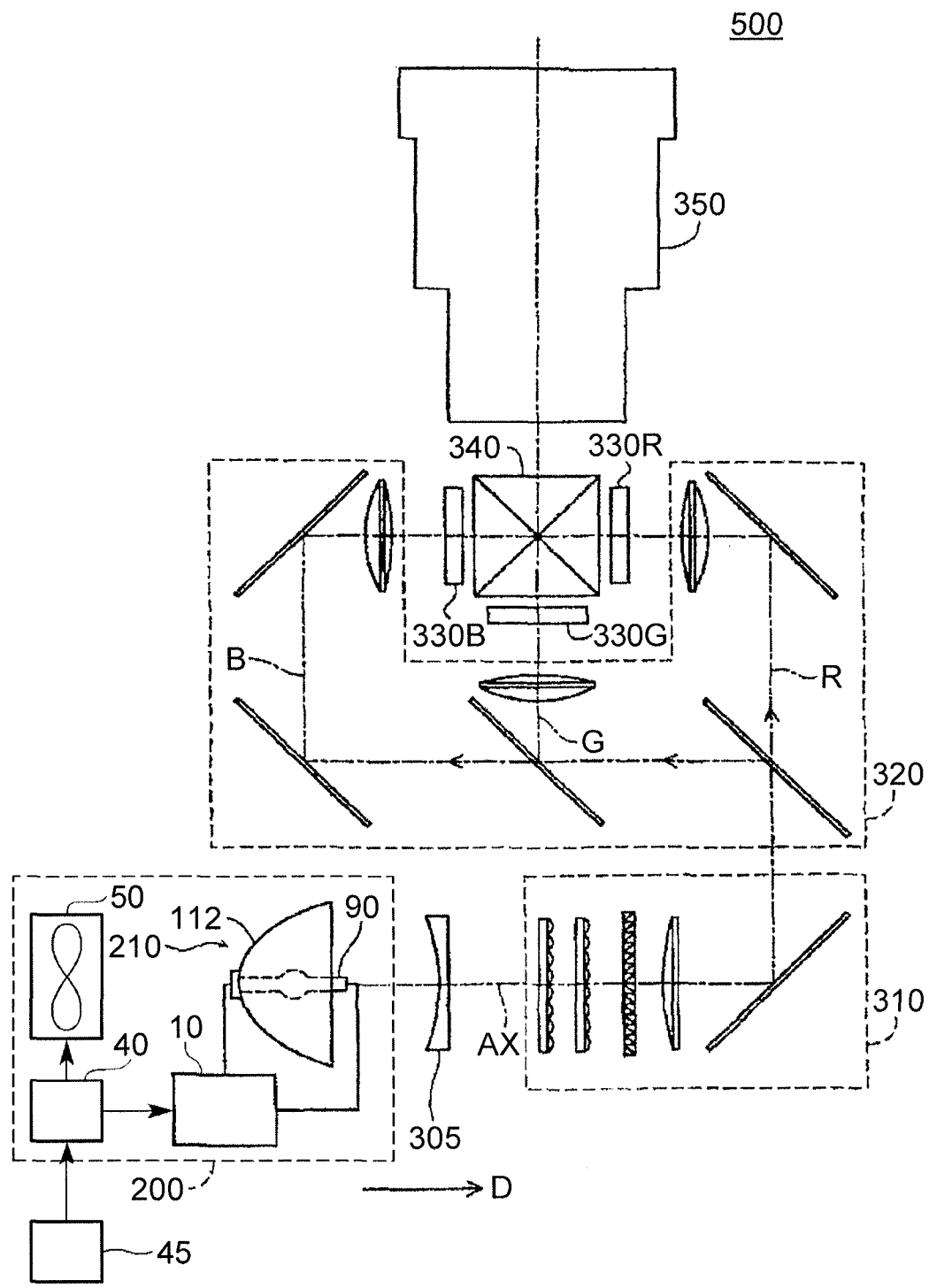
FIG. 1 is a schematic configuration diagram illustrating a projector according to a first embodiment.

As illustrated in FIG. 1, a projector 500 of the present embodiment includes a light source apparatus 200, a collimating lens 305, an illumination optical system 310, a color separation optical system 320, three liquid crystal light valves (light modulation devices) 330R, 330G and 330B, a cross dichroic prism 340, and a projection optical system 350.

Light emitted from the light source apparatus 200 passes through the collimating lens 305 and is incident to the illumination optical system 310. The collimating lens 305 collimates the light from the light source apparatus 200.

The illumination optical system 310 adjusts the illuminance of the light emitted from the light source apparatus 200 so that the illuminance is uniformized on the liquid crystal light valves 330R, 330G and 330B. The illumination optical system 310 aligns polarization directions of the light emitted from the light source apparatus 200 in one direction.

This is aimed at effectively using the light emitted from the light source apparatus 200 in the liquid crystal light valves 330R, 330G and 330B.

The light having undergone the adjustment of the illuminance distribution and the polarization directions is incident to the color separation optical system 320. The color separation optical system 320 separates the incident light into three color light beams including red light (R), green light (G), and blue light (B). The three color light beams are respectively modulated according to video signals by the liquid crystal light valves 330R, 330G and 330B which correspond to the respective color light beams. The liquid crystal light valves 330R, 330G and 330B respectively include liquid crystal panels 560R, 560G and 560B which will be described later, and polarization plates (not illustrated). The polarization plates are disposed on a light incidence side and a light emission side of each of the liquid crystal panels 560R, 560G and 560B.

The three modulated color light beams are combined with each other by the cross dichroic prism 340. The combined light is incident to the projection optical system 350. The projection optical system 350 projects the incident light onto a screen 700 (refer to FIG. 6). Thus, a video is displayed on the screen 700. In addition, well-known configurations may be employed as configurations of the collimating lens 305, the illumination optical system 310, the color separation optical system 320, the cross dichroic prism 340, and the projection optical system 350.

The light source apparatus 200 includes a light source unit 210, a discharge lamp lighting device 10, a control device (controller) 40, an input reception unit 45, and a cooling device (cooling unit) 50.

Figure 2:
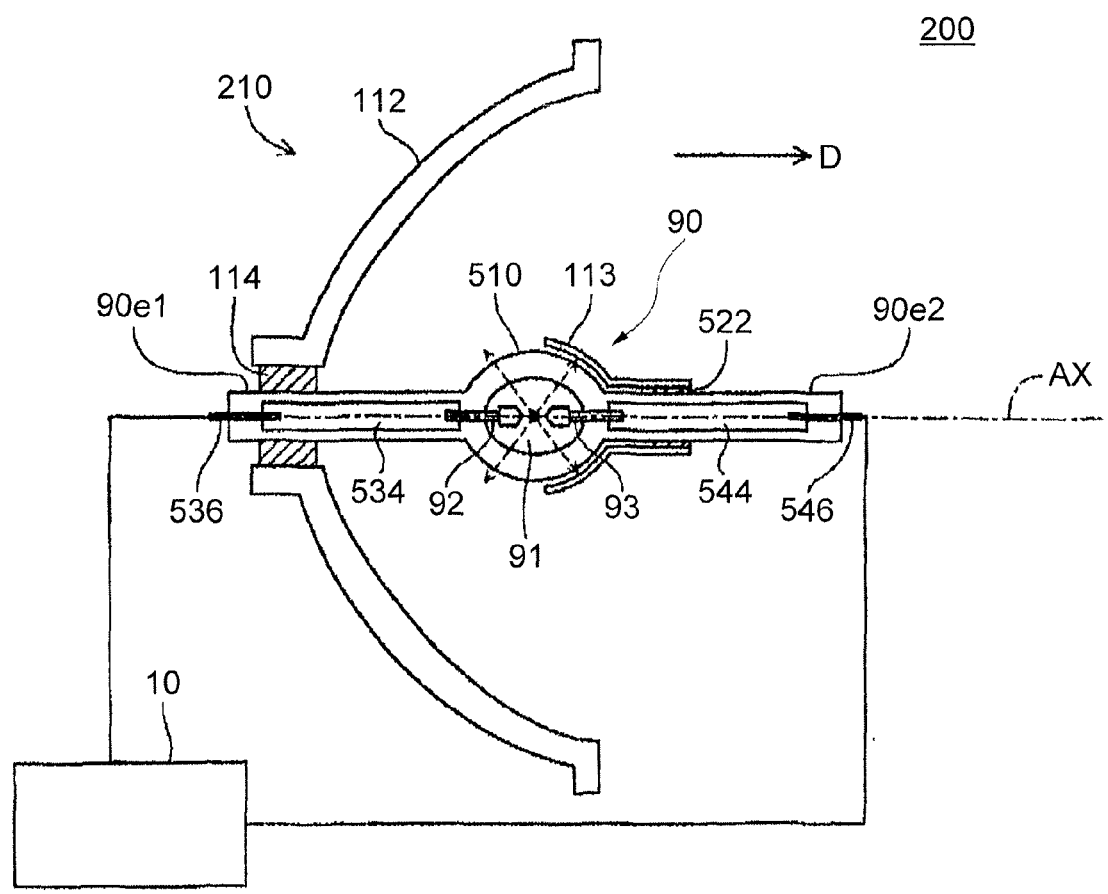
FIG. 2 is a sectional view illustrating a configuration of a light source apparatus according to the first embodiment.

FIG. 2 is a sectional view illustrating a configuration of the light source apparatus 200. FIG. 2 shows a sectional view of the light source unit 210. In FIG. 2, the control device 40 and the cooling device 50 are not illustrated.

Light Source Unit

As illustrated in FIG. 2, the light source unit 210 includes a discharge lamp 90, a main reflection mirror (reflection mirror) 112, and a subsidiary reflection mirror 113.

The discharge lamp lighting device 10 supplies a driving current I to the discharge lamp 90 so as to light the discharge lamp 90. The main reflection mirror 112 reflects light emitted from the discharge lamp 90 in an irradiation direction (predetermined direction) D. The irradiation direction D is parallel to an optical axis AX of the discharge lamp 90.

The discharge lamp 90 includes a discharge lamp main body 510, a first electrode 92, and a second electrode 93.

The discharge lamp main body 510 has a rod shape extending in the irradiation direction D. One end of the discharge lamp main body 510, that is, one end of the discharge lamp 90 is referred to as a first end 90e1. The other end of the discharge lamp main body 510, that is, the other end of the discharge lamp 90 is referred to as a second end 90e2. A material of the discharge lamp main body 510 is, for example, a light transmissive material such as quartz glass. A central portion of the discharge lamp main body 510 is swollen in a spherical shape, and the inside thereof is a discharge space 91. A gas which is a discharge medium containing mercury, rare gases, metal halogen compounds, and the like is enclosed in the discharge space 91.

Tips of the first electrode 92 and the second electrode 93 protrude in the discharge space 91. The first electrode 92 is disposed on the first end 90e1 side of the discharge space 91. The second electrode 93 is disposed on the second end 90e2 side of the discharge space 91. Each of the first electrode 92 and the second electrode 93 has a rod shape extending in the optical axis AX. The tips of the first electrode 92 and the second electrode 93 are disposed to face each other with a predetermined distance in the discharge space 91. A material of each of the first electrode 92 and the second electrode 93 is, for example, a metal such as tungsten.

Figure 3:
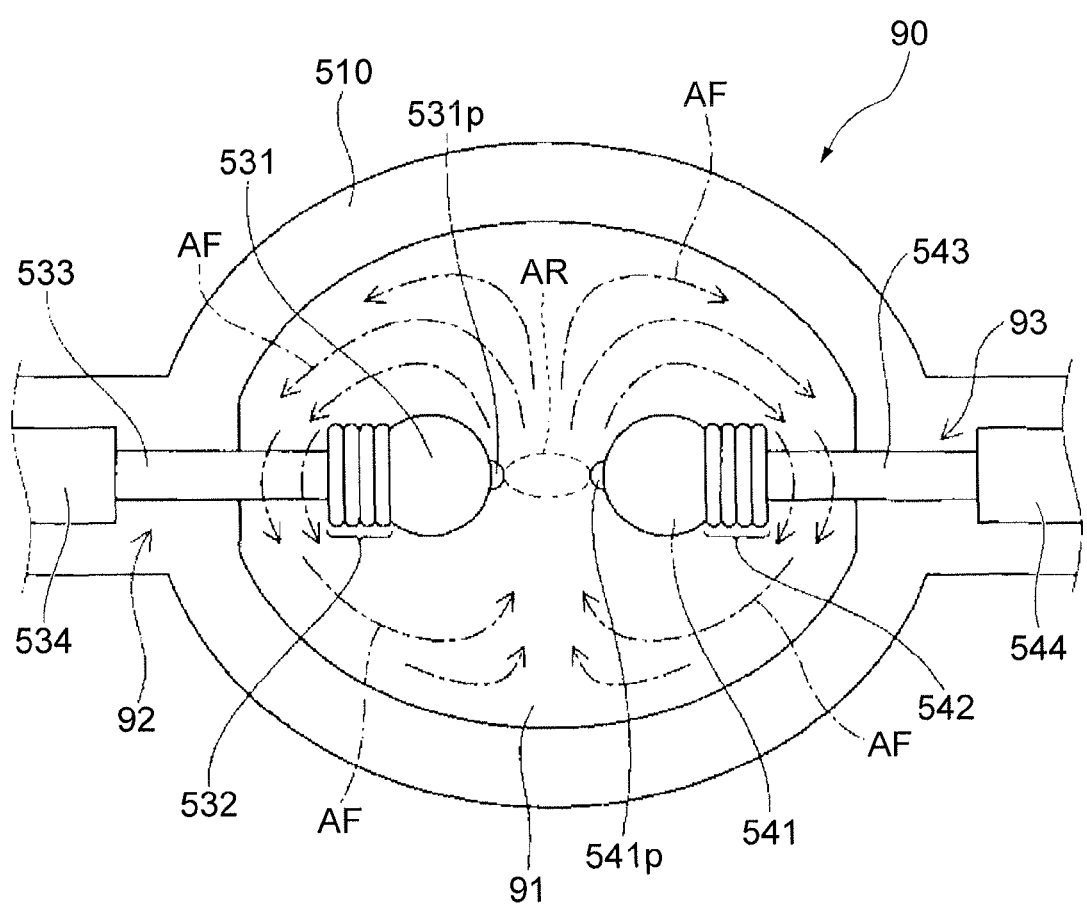
FIG. 3 is a partially enlarged sectional view of a discharge lamp according to the first embodiment.

FIG. 3 is an enlarged sectional view illustrating a part of the discharge lamp 90.

As illustrated in FIG. 3, the first electrode 92 includes a core rod 533, a coil portion 532, a main body portion 531, and a protrusion 531p. The first electrode 92 is formed by winding a wire material as an electrode material (tungsten or the like) on the core rod 533 in a stage of being enclosed in the discharge lamp main body 510 so as to form the coil portion 532 and by heating and melting the formed coil portion 532. Consequently, the main body portion 531 having a large thermal capacity and the protrusion 531p where an arc AR is generated are formed on a tip side of the first electrode 92.

The second electrode 93 includes a core rod 543, a coil portion 542, a main body portion 541, and a protrusion 541p. The second electrode 93 is formed in the same manner as the first electrode 92.

The first electrode 92 and the second electrode 93 have the same configuration, and, thus, in the following description, only the first electrode 92 will be described as a representative in some cases. The protrusion 531p of the first electrode 92 and the protrusion 541p of the second electrode 93 have the same configuration, and, thus, in the following description, only the protrusion 531p will be described as a representative in some cases.

As illustrated in FIG. 2, a first terminal 536 is provided at the first end 90e1 of the discharge lamp 90. The first terminal 536 and the first electrode 92 are electrically connected to each other via a conductive member 534 which penetrates through the discharge lamp 90. Similarly, a second terminal 546 is provided at the second end 90e2 of the discharge lamp 90. The second terminal 546 and the second electrode 93 are electrically connected to each other via a conductive member 544 which penetrates through the discharge lamp 90. A material of each of the first terminal 536 and the second terminal 546 is, for example, a metal such as tungsten. As a material of each of the conductive members 534 and 544, for example, a molybdenum foil is used.

The first terminal 536 and the second terminal 546 are connected to the discharge lamp lighting device 10. The discharge lamp lighting device 10 supplies the driving power for driving the discharge lamp 90 to the first terminal 536 and the second terminal 546. As a result, arc discharge occurs between the first electrode 92 and the second electrode 93. Light (discharge light) occurring due to the arc discharge is radiated in all directions from the discharge position as indicated by dashed arrows.

As illustrated in FIG. 3, if the discharge lamp 90 is lighted, a gas enclosed in the discharge space 91 is heated due to generation of the arc AR and undergoes convection in the discharge space 91. Specifically, since the temperature of the arc AR and a region therearound is considerably high, convections AF (indicated by a dot chain arrow in FIG. 3) which flow vertically upward from the arc AR are formed in the discharge space 91. The convections AF come into contact with the inner wall of the discharge lamp main body 510, move along the inner wall of the discharge lamp main body 510, and descend while being cooled as a result of passing through the core rods 533 and 543 of the first electrode 92 and the second electrode 93.

The descending convections AF further descend along the inner wall of the discharge lamp main body 510, but come into contact with each other on a vertically lower side of the arc AR, and thus ascend so as to return to the upper arc AR. As a result of the convections AF moving along the inner wall of the discharge lamp main body 510, the discharge lamp main body 510 is heated.

As illustrated in FIG. 2, the main reflection mirror 112 is fixed to the first end 90e1 of the discharge lamp 90 via a fixation member 114. The main reflection mirror 112 reflects light which travels toward an opposite side to the irradiation direction D among discharge light beams, in the irradiation direction D. A shape of a reflection surface (a surface on the discharge lamp 90 side) of the main reflection mirror 112 is not particularly limited within a range in which discharge light can be reflected in the irradiation direction D, and may be, for example, a spheroidal shape or a rotating parabolic shape. For example, in a case where a shape of the reflection surface of the main reflection mirror 112 is a rotating parabolic shape, the main reflection mirror 112 can convert discharge light into light which is substantially parallel to the optical axis AX. Consequently, the collimating lens 305 can be omitted.

The subsidiary reflection mirror 113 is fixed to the second end 90e2 side of the discharge lamp 90 via a fixation member 522. A shape of a reflection surface (a surface on the discharge lamp 90 side) of the subsidiary reflection mirror 113 is a spherical shape which surrounds a portion of the discharge space 91 on the second end 90e2 side. The subsidiary reflection mirror 113 reflects light which travels toward an opposite side to the side on which the main reflection mirror 112 is disposed among the discharge light beams, toward the main reflection mirror 112. Consequently, it is possible to increase usage efficiency of the light radiated from the discharge space 91.

A material of each of the fixation members 114 and 522 is not particularly limited as long as the material is a heat resistant material which can resist heat generated from the discharge lamp 90, and is, for example, an inorganic adhesive.

Discharge Lamp Lighting Device

Figure 4:
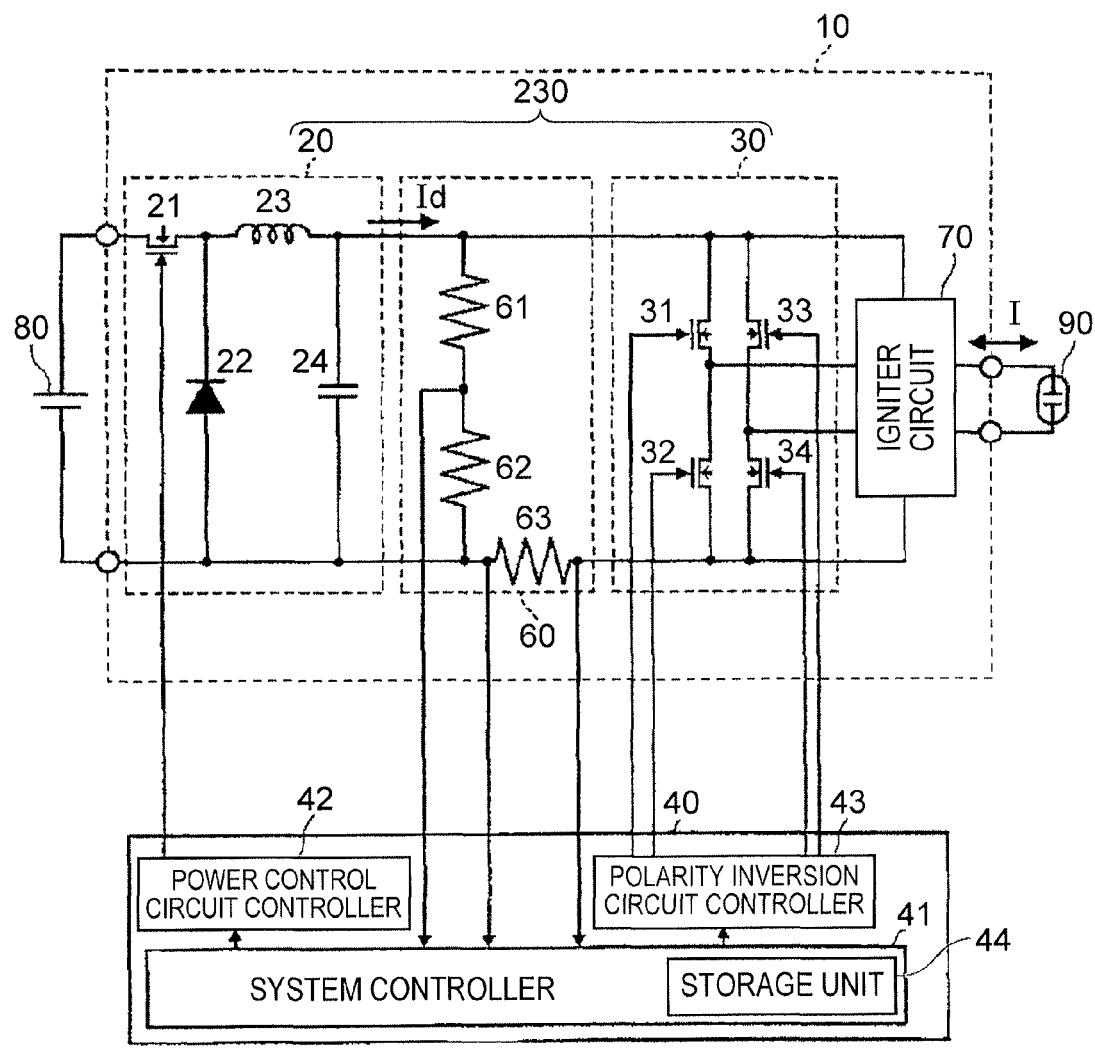
FIG. 4 is a circuit diagram illustrating a discharge lamp lighting device and a control device according to the first embodiment.

FIG. 4 is a diagram illustrating an example of a circuit configuration of the discharge lamp lighting device 10 and the control device 40.

As illustrated in FIG. 4, the discharge lamp lighting device 10 includes a power control circuit 20, a polarity inversion circuit 30, an operation detection unit 60, and an igniter circuit 70.

The power control circuit 20 generates the driving power which is supplied to the discharge lamp 90. In the present embodiment, the power control circuit 20 is constituted of a down chopper circuit which receives a voltage from a DC power source device 80 and outputs a DC current Id by stepping down the input voltage.

The power control circuit 20 is configured to include a switch element 21, a diode 22, a coil 23, and a capacitor 24. The switch element 21 is constituted of, for example, a transistor. In the present embodiment, one end of the switch element 21 is connected to a positive voltage side of the DC power source device 80, and the other end thereof is connected to a cathode terminal of the diode 22 and one end of the coil 23.

One end of the capacitor 24 is connected to the other end of the coil 23, and the other end of the capacitor 24 is connected to an anode terminal of the diode 22 and a negative voltage side of the DC power source device 80. A current control signal is input to a control terminal of the switch element 21 from the control device 40, and thus turning-on and turning-off of the switch element 21 are controlled. As the current control signal, for example, a pulse width modulation (PWM) control signal may be used.

If the switch element 21 is turned on, a current flows through the coil 23, and thus energy is accumulated in the coil 23. Thereafter, if the switch element 21 is turned off, the energy accumulated in the coil 23 is released along a path passing through the capacitor 24 and the diode 22. As a result, the DC current Id is generated which is proportional to a time period in which the switch element 21 is turned on.

The polarity inversion circuit 30 inverts a polarity of the DC current Id which is input from the power control circuit 20, at a predetermined timing. Consequently, the polarity inversion circuit 30 generates and outputs a driving current I as a DC which is continuously maintained only for a controlled time period, or a driving current I as an AC which has any frequency. In the present embodiment, the polarity inversion circuit 30 is constituted of an inverter bridge circuit (full bridge circuit).

The polarity inversion circuit 30 includes, for example, a first switch element 31, a second switch element 32, a third switch element 33, and a fourth switch element 34, constituted of transistors. The polarity inversion circuit 30 has a configuration in which the first switch element 31 and the second switch element 32 which are connected in series to each other are connected in parallel to the third switch element 33 and the fourth switch element 34 which are connected in series to each other. A polarity inversion control signal is input from the control device 40 to each of control terminals of the first switch element 31, the second switch element 32, the third switch element 33, and the fourth switch element 34. Turning-on and turning-off operations of each of the first switch element 31, the second switch element 32, the third switch element 33, and the fourth switch element 34 are controlled on the basis of the polarity inversion control signal.

In the polarity inversion circuit 30, an operation is repeatedly performed in which the first switch element 31 and the fourth switch element 34, and the second switch element 32 and the third switch element 33 are alternately turned on or off. Therefore, the polarities of the DC current Id output from the power control circuit 20 are alternately inverted. The polarity inversion circuit 30 generates and outputs a driving current I as a DC which is continuously maintained in the same polarity state only for a controlled time period or a driving current I as an AC having a controlled frequency, from a common connection point between the first switch element 31 and the second switch element 32, and a common connection point between the third switch element 33 and the fourth switch element 34.

In other words, in the polarity inversion circuit 30, the second switch element 32 and the third switch element 33 are controlled to be turned off when the first switch element 31 and the fourth switch element 34 are turned on, and the second switch element 32 and the third switch element 33 are controlled to be turned on when the first switch element 31 and the fourth switch element 34 are turned off. Thus, the driving current I is generated which flows in order of the first switch element 31, the discharge lamp 90, and the fourth switch element 34 from one end of the capacitor 24 when the first switch element 31 and the fourth switch element 34 are turned on. The driving current I is generated which flows in order of the third switch element 33, the discharge lamp 90, and the second switch element 32 from one end of the capacitor 24 when the second switch element 32 and the third switch element 33 are turned on.

In the present embodiment, the portion including the power control circuit 20 and the polarity inversion circuit 30 corresponds to a discharge lamp driving unit 230. In other words, the discharge lamp driving unit 230 supplies the driving current I for driving the discharge lamp 90 to the discharge lamp 90.

The operation detection unit 60 includes a voltage detection portion which detects a lamp voltage of the discharge lamp 90 and outputs lamp voltage information to the control device 40. The operation detection unit 60 includes a current detection portion or the like which detects the driving current I and outputs driving current information to the control device 40. In the present embodiment, the operation detection unit 60 is configured to include a first resistor 61, a second resistor 62, and a third resistor 63.

In the present embodiment, the voltage detection portion of the operation detection unit 60 detects the lamp voltage on the basis of a voltage divided by the first resistor 61 and the second resistor 62 which are connected in parallel to the discharge lamp 90 and are connected in series to each other. In addition, in the present embodiment, the current detection portion detects the driving current I on the basis of a voltage occurring at the third resistor 63 which is connected in series to the discharge lamp 90.

The igniter circuit 70 operates only at the time of starting of lighting of the discharge lamp 90. The igniter circuit 70 supplies a high voltage (a voltage higher than at normal lighting of the discharge lamp 90) which is necessary to cause dielectric breakdown between the electrodes (between the first electrode 92 and the second electrode 93) of the discharge lamp 90 and thus to form a discharge path, between the electrodes of the discharge lamp 90 (between the first electrode 92 and the second electrode 93) at the time of starting of lighting of the discharge lamp 90. In the present embodiment, the igniter circuit 70 is connected in parallel to the discharge lamp 90.

Control Device

The control device 40 controls various operations from starting to stoppage of operations of the projector 500. The control device 40 controls the discharge lamp driving unit 230 according to a driving current waveform of the driving current I. In the example illustrated in FIG. 4, the control device 40 controls the power control circuit 20 and the polarity inversion circuit 30 so as to control parameters such as duration in which the driving current I is continuously maintained to have the same polarity, and a current value and a frequency of the driving current I. The control device 40 performs polarity inversion control for controlling the duration in which the driving current I is continuously maintained to have the same polarity, a frequency of the driving current I, and the like, on the polarity inversion circuit 30, on the basis of a polarity inversion timing. The control device 40 performs current control for controlling a current value of the output DC current Id on the power control circuit 20.

The control device 40 controls the discharge lamp driving unit 230 so as to cause a period in which an alternating current of the driving current I is supplied to the discharge lamp 90 to transition from a steady lighting period (first AC period) PH1 to a heating period (second AC period) PH21 when the input reception unit 45 receives a stop operation on the projector 500, that is, a putting-out operation on the discharge lamp 90. Details thereof will be described later.

In the present embodiment, the control device 40 controls the cooling device 50. The control device 40 drives the cooling device 50 with a fan voltage (second output) which is higher than a steady fan voltage (first output) in the heating period PH21 which will be described later. Details thereof will be described later.

A configuration of the control device 40 is not particularly limited. In the present embodiment, the control device 40 is configured to include a system controller 41, a power control circuit controller 42, and a polarity inversion circuit controller 43. Some or all of the controllers of the control device 40 may be configured by using semiconductor integrated circuits.

The system controller 41 controls the power control circuit controller 42 and the polarity inversion circuit controller 43 so as to control the power control circuit 20 and the polarity inversion circuit 30. The system controller 41 may control the power control circuit controller 42 and the polarity inversion circuit controller 43 on the basis of a lamp voltage and the driving current I detected by the operation detection unit 60.

In the present embodiment, the system controller 41 is connected to a storage unit 44.

The system controller 41 may control the power control circuit 20 and the polarity inversion circuit 30 on the basis of information stored in the storage unit 44. The storage unit 44 may store, for example, information regarding driving parameters such as the duration in which the driving current I is continuously maintained to have the same polarity, a current value, a frequency, a waveform, and a modulation pattern of the driving current I.

The power control circuit controller 42 outputs a current control signal to the power control circuit 20 on the basis of a control signal from the system controller 41, so as to control the power control circuit 20.

The polarity inversion circuit controller 43 outputs a polarity inversion control signal to the polarity inversion circuit 30 on the basis of a control signal from the system controller 41, so as to control the polarity inversion circuit 30.

The control device 40 may be implemented by using a dedicated circuit so as to perform the above-described control or various control operations related to processes to be described later. In contrast, the control device 40 may function as a computer, for example, by executing a control program stored in the storage unit 44, so as to perform various control operations related to such processes.

Figure 5:
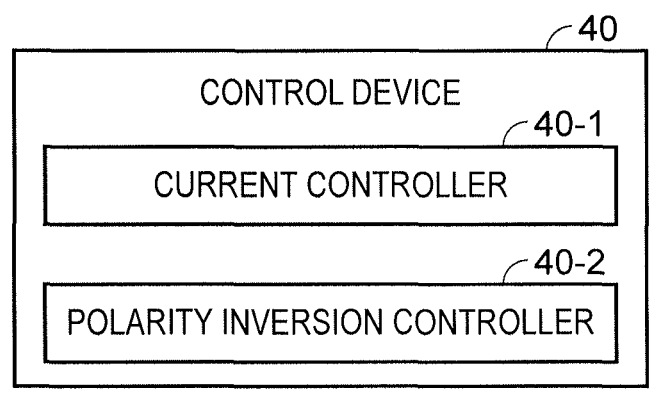
FIG. 5 is a block diagram illustrating a configuration example of the control device according to the first embodiment.

FIG. 5 is a diagram illustrating another configuration example of the control device 40. As illustrated in FIG. 5, the control device 40 may be configured to function as a current controller 40-1 which controls the power control circuit 20 and a polarity inversion controller 40-2 which controls the polarity inversion circuit 30 according to the control program.

Input Reception Unit

The input reception unit 45 illustrated in FIG. 1 receives a predetermined operation from a user. The input reception unit 45 receives user's operations, such as turning-on and turning-off of the supply of power to the projector 500, or changing of lighting modes. In the present embodiment, the input reception unit 45 is connected to the control device 40. In a case where a user's operation is received, the input reception unit 45 outputs an operation signal corresponding to the operation to the control device 40.

A method of the input reception unit 45 receiving an operation is not particularly limited. For example, the input reception unit 45 may receive an operation performed by pressing various buttons attached to a casing of the projector 500, and may receive an operation on the basis of a signal sent from a remote controller of the projector 500.

In the present embodiment, an operation of turning off the supply of power to the projector 500, that is, a stop operation includes a first stop operation and a second stop operation.

In other words, in the present embodiment, a user performs the first stop operation and the second stop operation so as to turn off the supply of power to the projector 500. As an example, the user may turn off the supply of power to the projector 500 by pressing a power button attached to the casing of the projector 500 twice.

If the input reception unit 45 receives the first stop operation, the control device 40 performs a checking operation for checking whether or not turning-off of the supply of power to the projector 500 is necessary. In other words, in a case where the input reception unit 45 receives the first stop operation, the control device 40 performs a checking operation for checking whether or not the supply stoppage of the driving current I to the discharge lamp 90 is necessary.

The checking operation is not particularly limited, and any method may be used as long as the method is allowed the user to check operation stoppage of the projector 500. As a checking operation, for example, a method may be selected in which an image for checking operation stoppage of the projector 500 is displayed on the screen 700. As a checking operation, a method may be selected in which sound for checking operation stoppage of the projector 500 is output.

The second stop operation is an operation which is performed temporally later than the first stop operation. The user performs the first stop operation, and then performs the second stop operation in a case of deciding execution of operation stoppage of the projector 500 in a checking operation. If the input reception unit 45 receives the second stop operation, the control device 40 controls the discharge lamp driving unit 230 to stop the supply of the driving current I to the discharge lamp 90. Consequently, the supply of power to the projector 500 is turned off.

The input reception unit 45 may receive the first stop operation and the second stop operation in the same method, or in different methods.

Cooling Device

The cooling device 50 includes, for example, a fan. The fan of the cooling device 50 is constituted of, for example, a sirocco fan. The fan of the cooling device 50 sucks cooled air in the casing of the projector 500 and sends the air to the light source unit 210. The cooling device 50 can cool the discharge lamp 90 of the light source unit 210 and the main reflection mirror 112 of the light source unit 210.

In the present embodiment, the cooling device 50 may include a single fan which can send air to the discharge lamp 90 and the main reflection mirror 112, and may include a fan which can send air to the discharge lamp 90 and a fan which can send air to the main reflection mirror 112.

Hereinafter, a circuit configuration of the projector 500 will be described.

Figure 6:
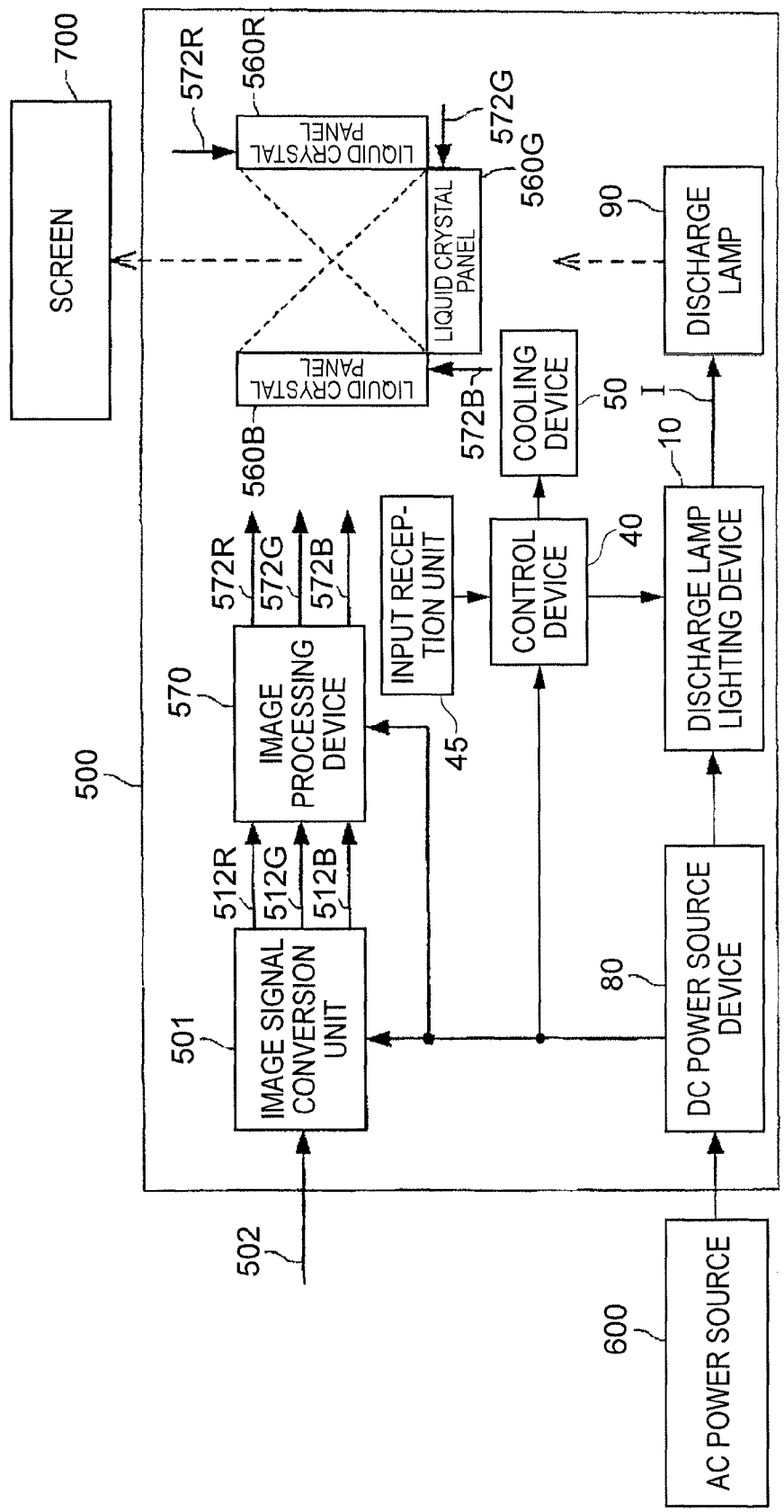
FIG. 6 is a block diagram illustrating various constituent elements of the projector according to the first embodiment.

FIG. 6 is a diagram illustrating an example of a circuit configuration of the projector 500 according to the present embodiment. The projector 500 includes, as illustrated in FIG. 6, an image signal conversion unit 501, the DC power source device 80, the liquid crystal panels 560R, 560G and 560B, and an image processing device 570, in addition to the configuration illustrated in FIG. 1.

The image signal conversion unit 501 converts image signals 502 (luminance-color difference signals, analog RGB signals, or the like) which are input from an external device into digital RGB signals with a predetermined word length so as to generate image signals 512R, 512G and 512B which are then supplied to the image processing device 570.

The image processing device 570 performs an image process on each of the three image signals 512R, 512G and 512B. The image processing device 570 supplies driving signals 572R, 572G and 572B for respectively driving the liquid crystal panels 560R, 560G and 560B, to the liquid crystal panels 560R, 560G and 560B.

The DC power source device 80 converts an AC voltage supplied from an external AC power source 600 into a constant DC voltage. The DC power source device 80 supplies DC voltages to the image signal conversion unit 501 and the image processing device 570 located on a secondary side of a transformer (not illustrated but included in the DC power source device 80) and the discharge lamp lighting device 10 located on a primary side of the transformer.

The discharge lamp lighting device 10 generates a high voltage between the electrodes of the discharge lamp 90 so as to cause dielectric breakdown and thus to form a discharge path during activation. Thereafter, the discharge lamp lighting device 10 supplies driving current I for the discharge lamp 90 maintaining discharge.

The liquid crystal panels 560R, 560G and 560B are respectively provided in the above-described liquid crystal light valves 330R, 330G and 330B. The liquid crystal panels 560R, 560G and 560B modulate transmittance (luminance) of the color light beams which are respectively incident to the liquid crystal panels 560R, 560G and 560B via the above-described optical systems on the basis of the respective driving signals 572R, 572G and 572B.

Hereinafter, a description will be made of a relationship between a polarity of the driving current I and the temperature of the electrode.

Figure 7A:
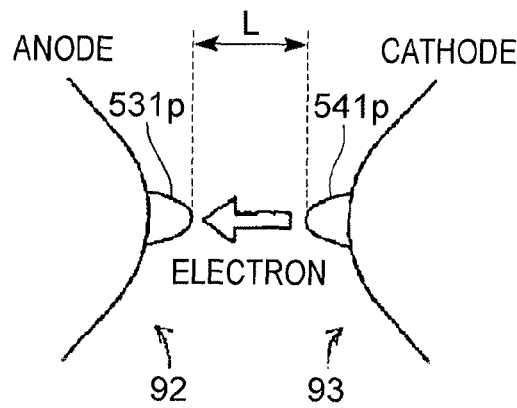
FIG. 7A is a diagram illustrating states of protrusions of electrode tips of the discharge lamp.
Figure 7B:
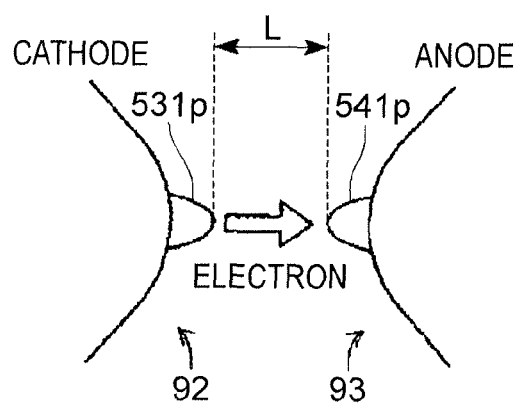
FIG. 7B is a diagram illustrating states of protrusions of electrode tips of the discharge lamp.
Figure 7C:
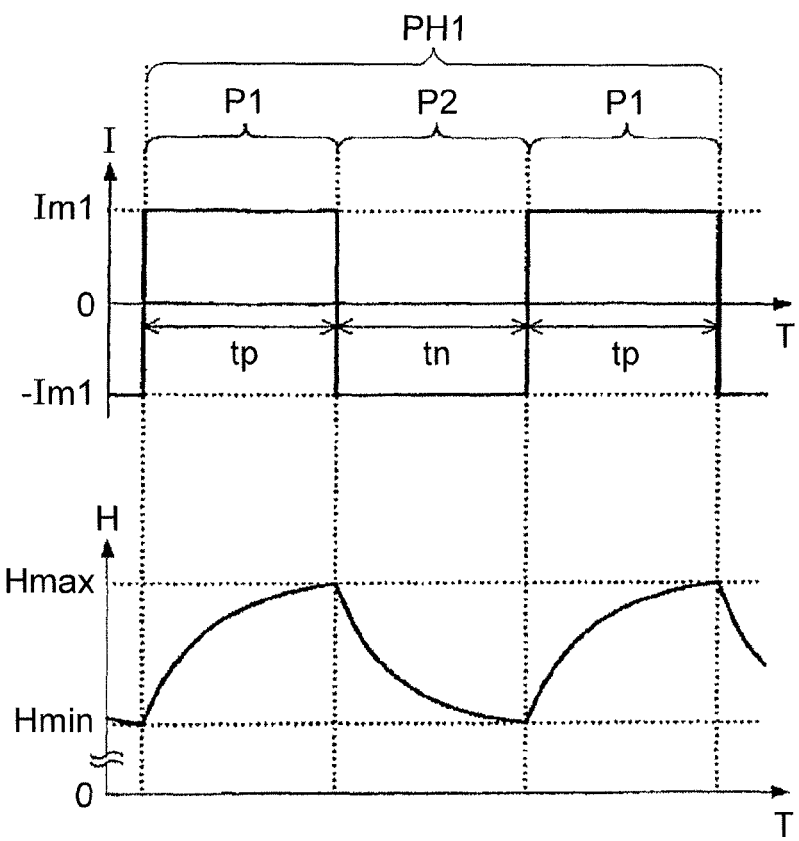
FIG. 7C is a timing chart illustrating a relationship between a driving current supplied to the discharge lamp and the temperature of an electrode.

FIGS. 7A to 7C are diagrams for explaining a relationship between a polarity of the driving current I supplied to the discharge lamp 90 and the temperature of the electrode. FIGS. 7A and 7B illustrate operation states of the first electrode 92 and the second electrode 93.

FIGS. 7A and 7B illustrate the tips of the first electrode 92 and the second electrode 93. Discharge occurring between the first electrode 92 and the second electrode 93 mainly occurs between the protrusion 531p and the protrusion 541p. In a case where the protrusions 531p and 541p are provided as in the present embodiment, movements of discharge positions (arc positions) at the first electrode 92 and the second electrode 93 can be minimized compared with a case where no protrusions are provided.

FIG. 7A illustrates a first polarity state in which the first electrode 92 operates as an anode, and the second electrode 93 operates as a cathode. In the first polarity state, electrons move from the second electrode 93 (cathode) to the first electrode 92 (anode) due to discharge. The electrons are emitted from the cathode (second electrode 93). The electrons emitted from the cathode (second electrode 93) collide with the tip (protrusion 531p) of the anode (first electrode 92). Heat is generated due to the collision, and thus the temperature of the first electrode 92 increases.

FIG. 7B illustrates a second polarity state in which the first electrode 92 operates as a cathode, and the second electrode 93 operates as an anode. Contrary to the first polarity state, in the second polarity state, electrons move from the first electrode 92 to the second electrode 93. As a result, the temperature of the tip of the second electrode 93 increases.

As mentioned above, when the driving current I is supplied to the discharge lamp 90, the temperature of the anode with which the electrons collide increases. On the other hand, the temperature of the cathode which emits the electrons decreases during emission of the electrons toward the anode.

An inter-electrode distance L between the first electrode 92 and the second electrode 93 is a distance between the protrusion 531p and the protrusion 541p. During driving of the discharge lamp 90, the protrusion 531p repeatedly performs melting and growth according to increase and decrease in the temperature of the first electrode 92. This is also the same for the protrusion 541p. The inter-electrode distance L increases when the protrusions 531p and 541p are melted, and decreases when the protrusions grow.

An upper part of FIG. 7C shows a timing chart illustrating an example of the driving current I supplied to the discharge lamp 90. On the upper part of FIG. 7C, a transverse axis expresses time T, and a longitudinal axis expresses a current value of the driving current I. The driving current I indicates a current which flows through the discharge lamp 90. A positive value indicates the first polarity state, and a negative value indicates the second polarity state. The upper part of FIG. 7C illustrates the driving current I in the steady lighting period PH1.

In the present embodiment, a square wave alternating current is used as the driving current I as illustrated on the upper part of FIG. 7C. In the steady lighting period PH1, the driving current I is supplied to the discharge lamp 90 so that a first polarity period P1 in which the first polarity state occurs and a second polarity period P2 in which the second polarity state occurs are alternately repeated.

In the example illustrated on the upper part of FIG. 7C, an average current value in the first polarity period P1 is Im1, and an average current value in the second polarity period P2 is −Im1. A driving frequency of the driving current I appropriate for driving of the discharge lamp 90 may be determined experimentally in accordance with characteristics of the discharge lamp 90.

A lower part of FIG. 7C shows a timing chart illustrating a temperature change of the first electrode 92. A transverse axis expresses time T, and a longitudinal axis expresses the temperature H. The temperature H of the first electrode 92 increases in the first polarity period P1, and the temperature H of the first electrode 92 decreases in the second polarity period P2. The first polarity period P1 and the second polarity period P2 are repeated, and thus the temperature H periodically changes between the minimum value Hmin and the maximum value Hmax. Although not illustrated, the temperature of the second electrode 93 changes in an opposite phase to the phase of the temperature H of the first electrode 92. In other words, the temperature of the second electrode 93 decreases in the first polarity period P1, and the temperature of the second electrode 93 increases in the second polarity period P2.

Next, a description will be made of control on the cooling device 50, performed by the control device 40.

The cooling device 50 can execute a steady output mode and a high output mode. The output mode of the cooling device 50 is controlled by the control device 40.

The steady output mode is an output mode in which a steady fan voltage (first output) is applied to the fan of the cooling device 50. The steady fan voltage is a fan voltage which is set in order to maintain the temperature of the discharge lamp 90 to be an appropriate temperature, and is set according to driving power. In the present embodiment, the steady fan voltage is set to be proportional to, for example, the driving power.

In the present specification, a fan voltage (steady fan voltage) is being proportional to driving power includes not only a case where the fan voltage is accurately proportional to the driving power but also, for example, a case where errors ranging from about 0.9 times to 1.1 times are allowable.

The high output mode is an output mode in which a fan voltage (second output) which is higher than the steady fan voltage (first output) is applied to the fan of the cooling device 50 with respect to driving power. In other words, in the present embodiment, the second output is a fan voltage which causes the temperature of the discharge lamp 90 to become lower than an appropriate temperature when the discharge lamp 90 is driven with driving power.

In the present embodiment, the controller 40 drives the cooling device 50 in the steady output mode in the steady lighting period PH1. In the present embodiment, the control device 40 drives the cooling device 50 in the high output mode in at least a part of the heating period PH21.

For example, in a case where the cooling device 50 is configured to include a fan which can send air to the discharge lamp 90 and a fan which can send air to the main reflection mirror 112, either one of the fan which can send air to the discharge lamp 90 and the fan which can send air to the main reflection mirror 112 can be driven in the high output mode.

Next, a description will be made of the driving current I supplied to the discharge lamp 90 in the present embodiment.

Figure 8:
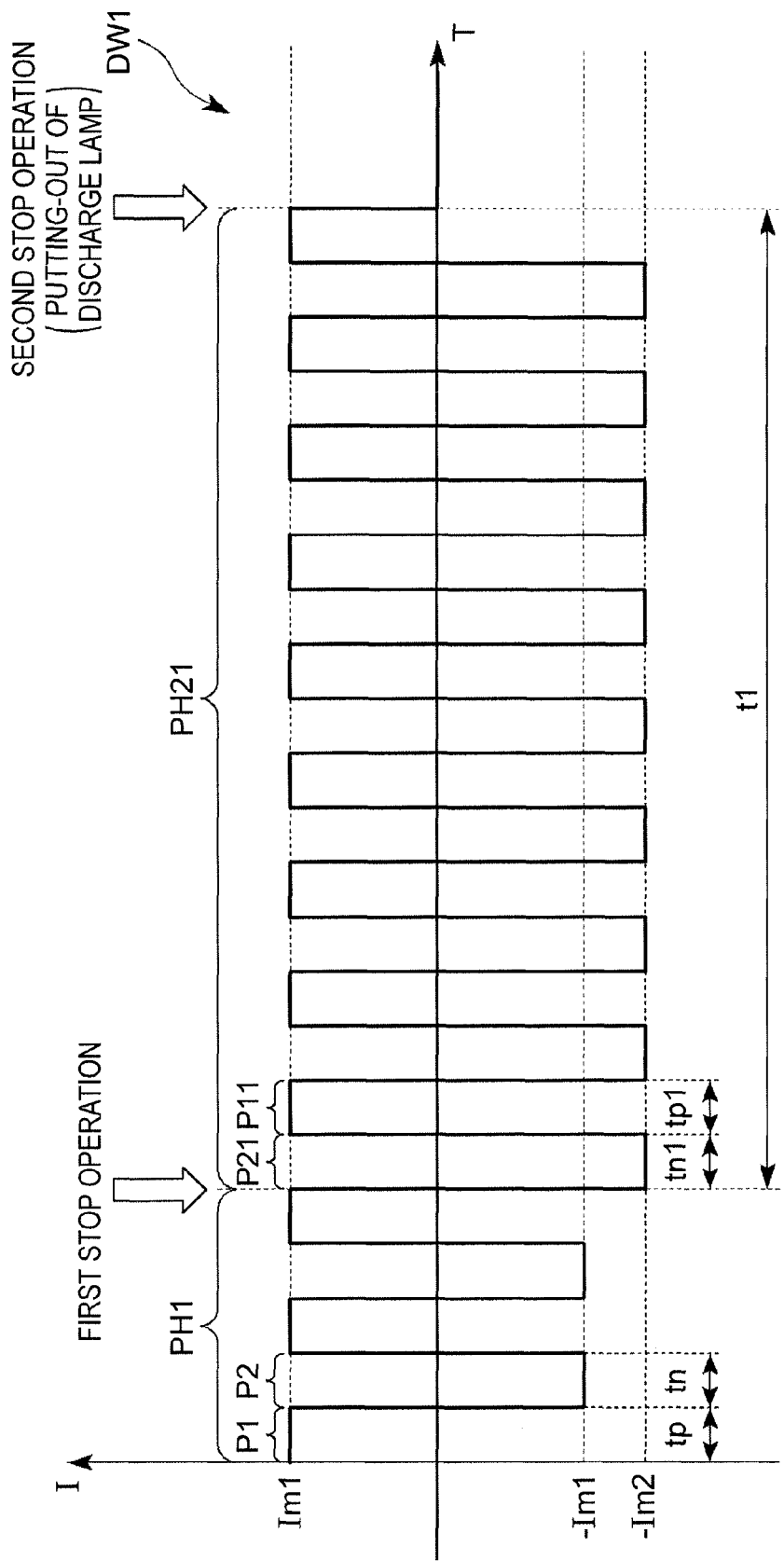
FIG. 8 is a diagram illustrating an example of a driving current waveform according to the first embodiment.

FIG. 8 is a diagram illustrating an example of a driving current waveform DW1 of the present embodiment. FIG. 8 illustrates the driving current waveform DW1 before and after the input reception unit 45 receives a stop operation.

As illustrated in FIG. 8, the driving current waveform DW1 (driving current I) includes the steady lighting period PH1 and the heating period PH21 in which an alternating current is supplied to the discharge lamp 90. In the present embodiment, the driving current waveform DW1 transitions from the steady lighting period PH1 to the heating period PH21 when the input reception unit 45 receives the first stop operation.

The steady lighting period PH1 alternately includes the first polarity period P1 and the second polarity period P2 as described above.

In the present embodiment, the heating period PH21 is entirely provided after the input reception unit 45 receives the first stop operation until receiving the second stop operation. In other words, a length t1 of the heating period PH21 corresponds to a time period after the user performs the first stop operation until performing the second stop operation.

The heating period PH21 alternately includes a first polarity period P11 in which the first polarity state occurs and a second polarity period P21 in which the second polarity state occurs. In other words, in the heating period PH21, an alternating current is supplied to the discharge lamp 90.

In the present embodiment, a value of the driving current I of the first polarity period P11 is, for example, Im1. In other words, the value of the driving current I of the first polarity period P11 is the same as, for example, a value of the driving current I of the first polarity period P1 in the steady lighting period PH1.

A value of the driving current I of the second polarity period P21 is, for example, −Im2. An absolute value of −Im2 is greater than an absolute value of −Im1. In other words, an absolute value of the driving current I of the second polarity period P21 in the heating period PH21 is greater than an absolute value of the driving current I of the second polarity period P2 in the steady lighting period PH1.

As an example, an absolute value of the driving current I of the second polarity period P21 in the heating period PH21 is 0.8 times or greater and 1.25 times or smaller than an absolute value of the driving current I obtained when rating power is supplied to the discharge lamp 90. In other words, driving power of the second polarity period P21 in the heating period PH21 is 0.8 times or higher and 1.25 times or lower than the rating power. The absolute value of the driving current I of the second polarity period P21 is set in the above-described way, and thus it is possible to appropriately increase the temperature of the second electrode 93 and also to prevent the second electrode 93 from being depleted.

In the example illustrated in FIG. 8, a frequency of the driving current I in the heating period PH21 is the same as a frequency in the steady lighting period PH1. A length tp of the first polarity period P1 in the steady lighting period PH1 is the same as a length tp1 of the first polarity period P11 in the heating period PH21. A length to of the second polarity period P2 in the steady lighting period PH1 is the same as a length tn1 of the second polarity period P21 in the heating period PH21.

The control device 40 controls the discharge lamp driving unit 230 according to the above-described driving current waveform DW1.

The above-described embodiment may be expressed as a control method for the projector. In other words, a control method for the projector of the present embodiment includes causing the discharge lamp 90 to emit light; causing the main reflection mirror 112 to reflect the light emitted from the discharge lamp 90 in the irradiation direction D; and causing the input reception unit 45 to receive a predetermined operation, in which the discharge lamp 90 includes the discharge lamp main body 510 having the discharge space 91 therein, and the first electrode 92 and the second electrode 93 protruding in the discharge space 91, in which the main reflection mirror 112 is attached to the first end 90e1 of the discharge lamp main body 510, the first electrode 92 is disposed on the first end 90e1 side, and the second electrode 93 is disposed on the second end 90e2 side of the discharge lamp main body 510 on an opposite side to the first end 90e1, in which the driving current I includes the steady lighting period PH1 and the heating period PH21 in which an alternating current is supplied to the discharge lamp 90, in which the steady lighting period PH1 and the heating period PH21 alternately include the first polarity periods P1 and P11 in which the first electrode 92 serves as an anode and the second polarity periods P2 and P21 in which the second electrode 93 serves as the anode, in which, in a case where the input reception unit 45 receives a stop operation on the projector, a period in which an alternating current is supplied to the discharge lamp 90 transitions from the steady lighting period PH1 to the heating period PH21, and in which an absolute value of the driving current I of the second polarity period P21 in the heating period PH21 becomes greater than an absolute value of the driving current I of the second polarity period P2 in the steady lighting period PH1.

According to the present embodiment, it is possible to provide the projector having a configuration capable of minimizing a mercury bridge and of minimizing deterioration in convenience. Hereinafter, details thereof will be described.

First, the mercury bridge will be described.

Figure 12:
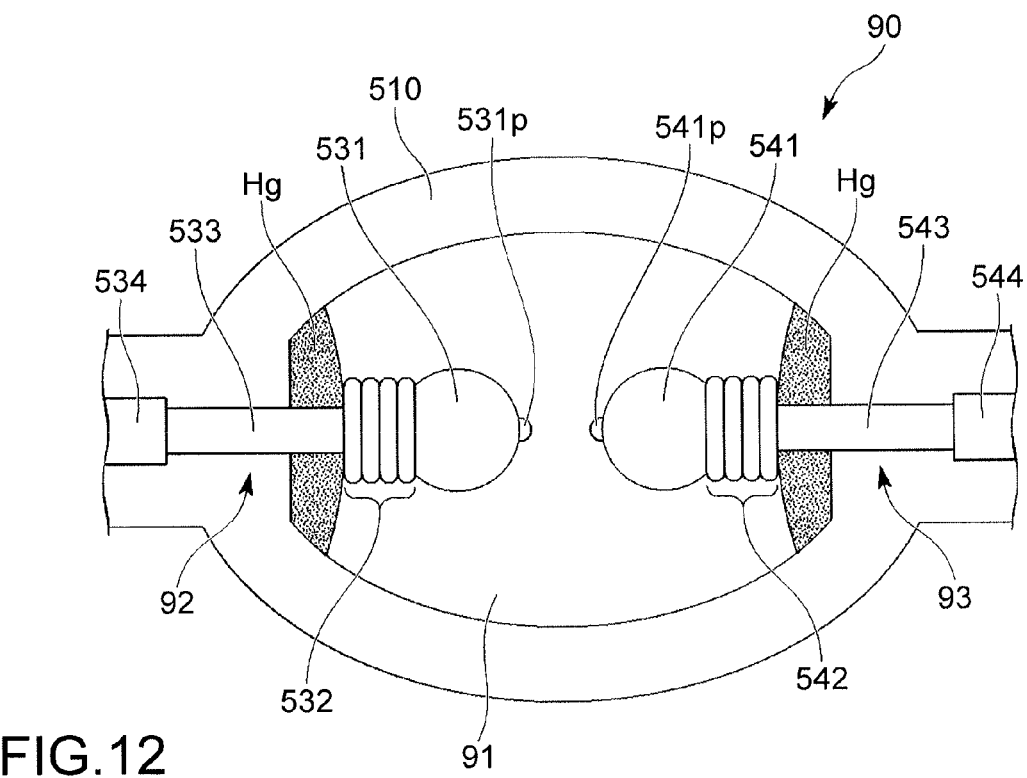
FIG. 12 is a diagram for explaining a mercury bridge.
Figure 13:
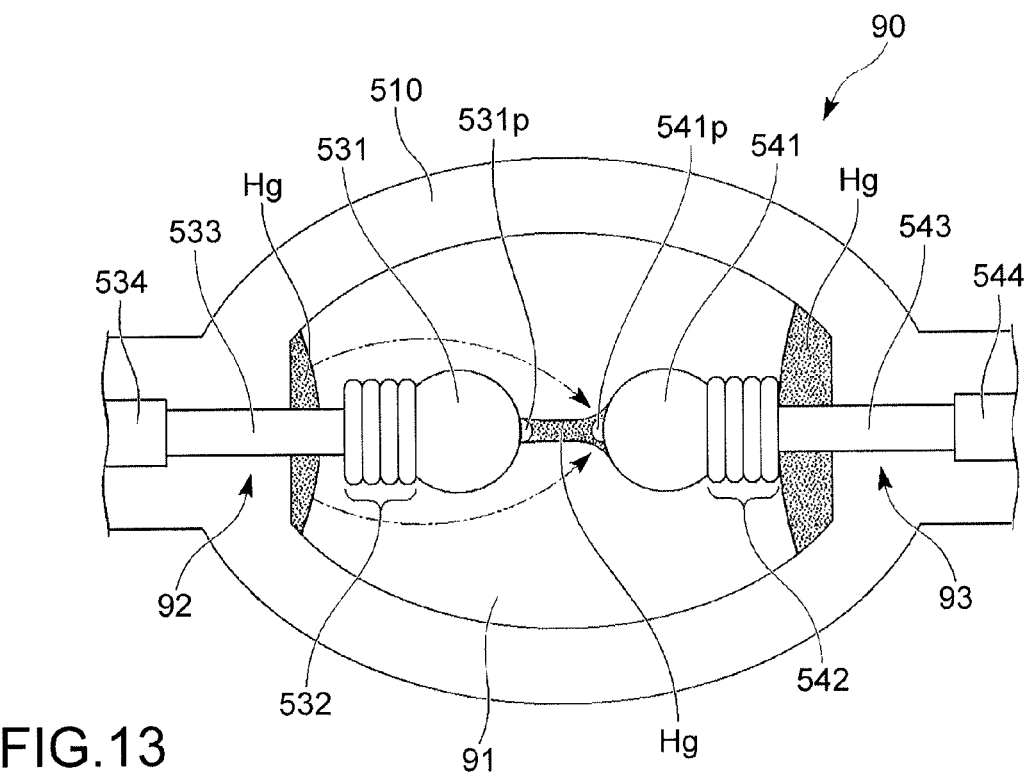
FIG. 13 is a diagram for explaining a mercury bridge.

FIGS. 12 and 13 are diagrams for explaining the mercury bridge. FIG. 12 illustrates a state in which time does not elapse much after the discharge lamp 90 is put out. FIG. 13 illustrates a state in which time elapses to some extent after the discharge lamp 90 is put out, and thus the mercury bridge is generated.

As illustrated in FIG. 12, if the discharge lamp 90 is put out, the temperatures of the first electrode 92 and the second electrode 93, and the temperature of the discharge lamp main body 510 decrease. For this reason, gaseous mercury Hg enclosed in the discharge space 91 condenses. The temperature of the discharge lamp main body 510 is lower than the temperatures of the first electrode 92 and the second electrode 93, and thus mercury Hg condenses on the inner wall of the discharge lamp main body 510. Mercury Hg very easily condenses at an end of the inner wall of the discharge lamp main body 510 on the side where the first electrode 92 protrudes and at an end thereof on the side where the second electrode 93 protrudes. This is because the end of the inner wall of the discharge lamp main body 510 on the side where the first electrode 92 protrudes and at the end of the inner wall of the discharge lamp main body 510 on the side where the second electrode 93 protrudes are separated from the location where the arc discharge occurs, and thus the temperatures thereof are more easily become lower than the temperatures of other portions of the inner wall of the discharge lamp main body 510.

As illustrated in FIG. 13, if time elapses to some extent after the discharge lamp 90 is put out, a part of mercury Hg may be vaporized again. This is because the pressure in the discharge space 91 is reduced due to condensation of mercury Hg, and thus the boiling point of mercury Hg is reduced.

Here, the main reflection mirror 112 is attached on the first end 90e1 side of the discharge lamp 90. Since the main reflection mirror 112 has a relatively large thermal capacity, the temperature thereof is easily maintained. Consequently, heat of the main reflection mirror 112 is transferred to the first end 90e1, and thus the temperature on the first end 90e1 side of the discharge lamp main body 510 is unlikely to become lower than the temperature on the second end 90e2 side of the discharge lamp main body 510. Therefore, the temperature on the first end 90e1 side of the inner wall of the discharge lamp main body 510 is likely to become higher than the boiling point of mercury Hg, and mercury Hg which has condensed on the first end 90e1 side of the inner wall of the discharge lamp main body 510 is easily vaporized.

Vaporized mercury Hg condenses again at a location whose temperature is lower than the boiling point of mercury Hg in the discharge space 91. The temperatures of the first electrode 92 and the second electrode 93 more easily decrease than the temperature of the discharge lamp main body 510. For this reason, the temperatures of the first electrode 92 and the second electrode 93 become lower than the temperature of the discharge lamp main body 510 if some time elapses after the discharge lamp 90 is put out. At this time, since the first electrode 92 is provided on the first end 90e1 side and thus receives heat transferred from the main reflection mirror 112, the temperature thereof is likely to be maintained. In other words, the temperature of the first electrode 92 is unlikely to become lower than the temperature of the second electrode 93. Therefore, the temperature of the second electrode 93 is likely to become lower than the temperature of the discharge lamp main body 510 and the boiling point of mercury Hg earlier than the temperature of the first electrode 92.

Figure 9:
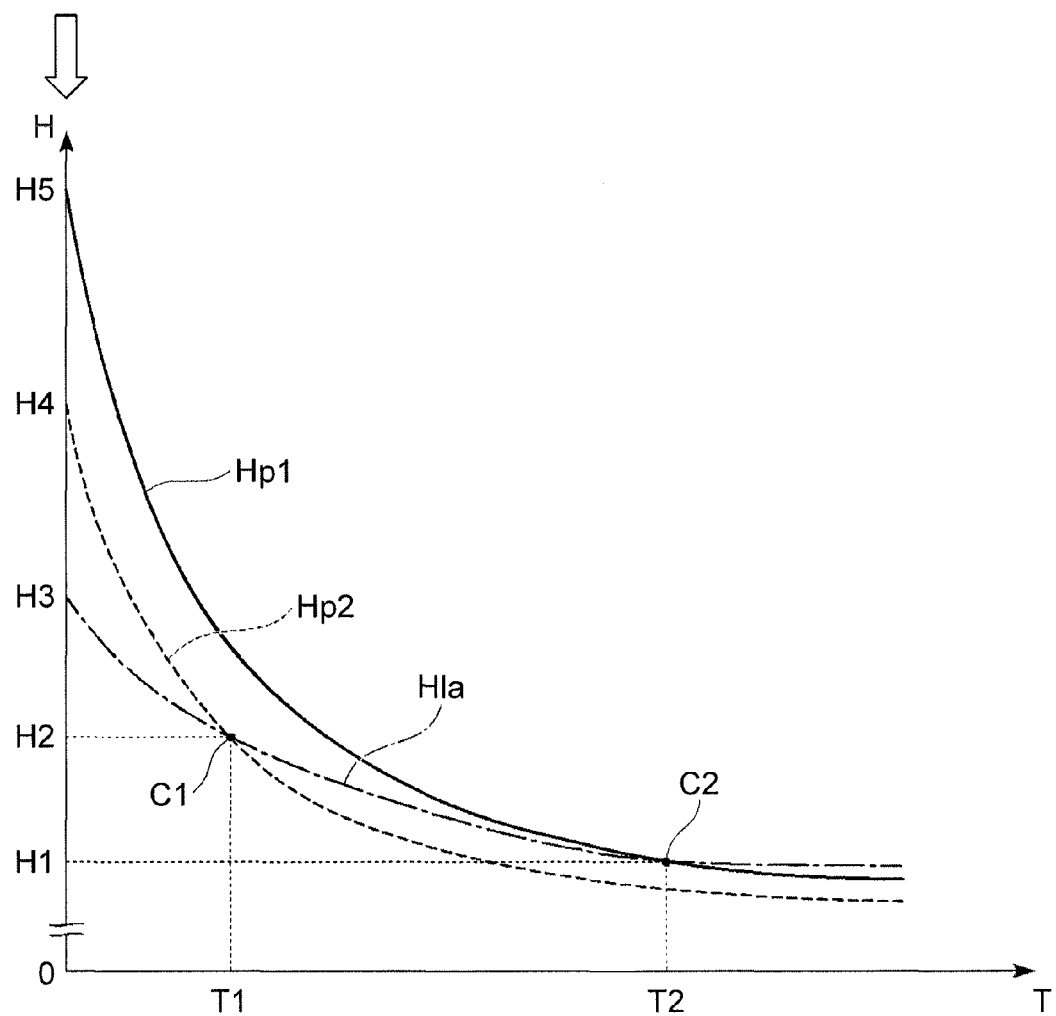
FIG. 9 is a graph illustrating temperature changes of a second electrode and a discharge lamp main body according to the first embodiment.

FIG. 9 is a graph illustrating a temperature change of the second electrode 93 and a temperature change of the discharge lamp main body 510. In FIG. 9, a transverse axis expresses time T, and a longitudinal axis expresses a temperature H. In FIG. 9, a solid line indicates a temperature Hp1 of the second electrode 93 of the present embodiment. In FIG. 9, a dashed line indicates a temperature Hp2 of the second electrode 93 in a comparative example. In FIG. 9, a dot chain line indicates a temperature H1a of the discharge lamp main body 510.

The comparative example refers to a case where, when the input reception unit 45 receives a stop operation on the projector 500, the discharge lamp 90 is put out without transition of a period in which an alternating current is supplied to the discharge lamp 90 from the steady lighting period PH1 to the heating period PH21.

The temperature H1a of the discharge lamp main body 510 is the temperature of a portion whose temperature is lowest on the inner wall of the discharge lamp main body 510.

As illustrated in FIG. 9, at the time when the discharge lamp 90 is put out, the temperature H1a of the discharge lamp main body 510 is H3, and the temperature Hp2 of the second electrode 93 of the comparative example is H4 which is higher than H3. The temperature H1a and the temperature Hp2 gradually decrease with the passage of time. At a time point T1, the temperature H1a and the temperature Hp2 have the same value H2. If the time point T1 is exceeded, a relationship between the temperature H1a of the discharge lamp main body 510 and the temperature Hp2 of the second electrode 93 of the comparative example is reversed. In other words, the temperature Hp2 of the second electrode 93 of the comparative example becomes lower than the temperature H1a of the discharge lamp main body 510.

In a case where the temperature Hp2 of the second electrode 93 of the comparative example becomes lower than the temperature H1a of the discharge lamp main body 510, if the temperature Hp2 of the second electrode 93 is lower than the boiling point of mercury Hg, vaporized mercury Hg easily condenses at the second electrode 93. Mercury Hg considerably easily condenses at the protrusion 541p of the second electrode 93. Consequently, as illustrated in FIG. 13, a mercury bridge may be generated as a result of the first electrode 92 and the second electrode 93 being connected to each other via mercury Hg which has condensed.

In contrast, in the present embodiment, the driving current waveform DW1 includes the heating period PH21. In the heating period PH21, an absolute value of the driving current I of the second polarity period P21 is greater than an absolute value of the driving current I of the second polarity period P2 in the steady lighting period PH1. For this reason, the second electrode 93 is heated in the heating period PH21 more than in the steady lighting period PH1, and thus the temperature Hp1 of the second electrode 93 increases. Consequently, as illustrated in FIG. 9, a value of the temperature Hp1 of the second electrode 93 is H5 which is higher than the temperature Hp2 of the second electrode 93 of the comparative example at the time when the discharge lamp 90 is put out.

The temperature Hp1 of the second electrode 93 of the present embodiment decreases with the passage of time, and has the same value (H1) as the temperature H1a of the discharge lamp main body 510 at a time point T2. At the time when the discharge lamp 90 is put out, the value of the temperature Hp1 of the second electrode 93 is greater than the value of the temperature Hp2 of the second electrode 93 of the comparative example, and the time point T2 is later than the time point T1. In other words, a time period to reach an intersection C2 at which the relationship between the temperature Hp1 of the second electrode 93 and the temperature H1a of the discharge lamp main body 510 is reversed is longer than a time period to reach an intersection C1 at which the relationship between the temperature Hp2 of the second electrode 93 and the temperature H1a of the discharge lamp main body 510 is reversed.

Therefore, before the intersection C2 is reached, that is, before the temperature Hp1 of the second electrode 93 becomes lower than the temperature H1a of the discharge lamp main body 510, the temperature H1a of the discharge lamp main body 510 is likely to become lower than the boiling point of Hg. As a result, according to the present embodiment, vaporized mercury Hg easily condenses on the inner wall of the discharge lamp main body 510, and thus mercury Hg can be prevented from condensing at the second electrode 93.

The temperature Hp1 of the second electrode 93 increases in a relatively short time period in the heating period PH21. For this reason, it is possible to shorten a period in which an operation state of the projector 500 is maintained after the user performs the stop operation. Consequently, according to the present embodiment, it is possible to minimize deterioration in convenience of the projector 500.

As mentioned above, according to the present embodiment, it is possible to provide the projector having a configuration capable of minimizing a mercury bridge and of minimizing deterioration in convenience.

In a case where driving power is lower than the rating power in the steady lighting period PH1, that is, the discharge lamp 90 is driven in a low power mode, the extent of the discharge lamp 90 being cooled by the cooling device 50 is lowered. For this reason, the temperature H1a of the discharge lamp main body 510 tends to increase at the time when the discharge lamp is put out. Consequently, a time period until the temperature Hp1 of the second electrode 93 becomes lower than the temperature H1a of the discharge lamp main body 510 after the discharge lamp 90 is put out tends to be shortened.

In the low power mode, the first electrode 92 and the second electrode 93 tend to grow, and the inter-electrode distance L tends to be shortened. For this reason, the first electrode 92 and the second electrode 93 are likely to be connected to each other via mercury Hg which has condensed.

As described above, in a case where the discharge lamp 90 is driven in the lower power mode in the steady lighting period PH1, a mercury bridge is more easily generated than in a case where the discharge lamp 90 is driven with the rating power. Therefore, the present embodiment is notably effective in a case where the discharge lamp 90 is driven in the low power mode in the steady lighting period PH1.

In a case where the temperature of the periphery of the projector 500 is high, the temperature of the discharge lamp main body 510 is unlikely to decrease after the discharge lamp 90 is put out. For this reason, a time period until the temperature Hp1 of the second electrode 93 becomes lower than the temperature H1a of the discharge lamp main body 510 is lengthened. Consequently, a mercury bridge is more easily generated as the temperature of the periphery of the projector 500 becomes higher. Therefore, the present embodiment is notably effective in a case where the temperature of the periphery of the projector 500 is high.

According to the present embodiment, since the second electrode 93 is heated in the heating period PH21, a melting amount of the protrusion 541p at the tip of the second electrode 93 is increased. Thus, the inter-electrode distance L of the first electrode 92 and the second electrode 93 is lengthened. Therefore, even in a case where mercury Hg condenses at the protrusion 541p of the second electrode 93, it is possible to prevent the first electrode 92 and the second electrode 93 from being connected to each other. In other words, according to the present embodiment, it is possible to further minimize the occurrence of a mercury bridge.

According to the present embodiment, the heating period PH21 is provided between the first stop operation and the second stop operation. For this reason, it is possible to stop an operation of the projector 500 without maintaining a state in which the discharge lamp 90 is lighting after the user performs the second stop operation. Therefore, according to the present embodiment, it is possible to improve convenience of the projector 500.

According to the present embodiment, in a case where the input reception unit 45 receives the first stop operation, a checking operation for checking whether or not turning-off of the supply of power to the projector 500 is necessary, that is, whether or not putting-out of the discharge lamp 90 is necessary. For this reason, it is possible to prevent a user from wrongly turning off the supply of power to the projector.

According to the present embodiment, in a case where the input reception unit 45 receives the second stop operation, the supply of the driving current I to the discharge lamp 90 is stopped. For this reason, it is possible to turn off the supply of power to the projector 500 right after the user performs the second stop operation.

According to the present embodiment, the cooling device 50 is driven in the high output mode in at least a part of the heating period PH21. For this reason, the temperature of the discharge lamp 90, that is, both or either one of the temperature H1a of the discharge lamp main body 510 and the temperature of the main reflection mirror 112 can be made lower than an appropriate temperature.

In a case where the temperature H1a of the discharge lamp main body 510 decreases in the heating period PH21, the temperature H1a of the discharge lamp main body 510 at the time of the discharge lamp 90 being put out is lowered. Consequently, it is possible to further lengthen a time period until the temperature Hp1 of the second electrode 93 becomes lower than the temperature H1a of the discharge lamp main body 510 after the discharge lamp 90 is put out. Therefore, according to the present embodiment, it is possible to further minimize the generation of a mercury bridge.

In a case where the temperature of the main reflection mirror 112 decreases in the heating period PH21, the temperature of the first end 90e1 of the discharge lamp is unlikely to be maintained. Consequently, the temperature of the inner wall of the discharge lamp main body 510 on the first end 90e1 side is likely to be lowered, and is thus prevented from becoming higher than the boiling point of mercury Hg. Therefore, according to the present embodiment, it is possible to prevent mercury Hg on the first end 90e1 side from being vaporized again, and, as a result, to further minimize the occurrence of a mercury bridge.

In the present embodiment, the following configurations and methods may be employed.

In the present embodiment, the heating period PH21 may be provided in a partial period between the first stop operation and the second stop operation. In this case, the length t1 of the heating period PH21 is appropriately set. For example, the length t1 of the heating period PH21 is set to be equal to or more than 5.0 milliseconds (ms) and be equal to or less than 10 seconds (s). The length t1 of the heating period PH21 is set in the above-described way, and thus it is possible to appropriately heat the second electrode 93 and also to prevent the second electrode 93 from being too melted.

In a case where the length t1 of the heating period PH21 is set to a predetermined length, the input reception unit 45 may receive the second stop operation before the heating period PH21 ends. In this case, the discharge lamp 90 is in a lighting state until the heating period PH21 ends after the user performs the second stop operation. However, even in this case, according to the present embodiment, the heating period PH21 can be shortened, and thus it is possible to minimize deterioration in convenience of the projector 500.

In the above description, the user turns off the supply of power to the projector 500 by performing two stop operations including the first stop operation and the second stop operation, but the invention is not limited thereto. In the present embodiment, the supply of power to the projector 500 may be turned off by performing a single stop operation. In this case, the discharge lamp 90 is put out after the input reception unit 45 receives a stop operation and then the heating period PH21 ends.

In the present embodiment, the cooling device 50 may be driven in the steady output mode in the heating period PH21.

In the present embodiment, the cooling device 50 may cool only the discharge lamp 90.

In the present embodiment, a frequency of the driving current I in the heating period PH21 may be higher than a frequency of the driving current I in the steady lighting period PH1. In other words, the length tp1 of the first polarity period P11 in the heating period PH21 may be smaller than the length tp of the first polarity period P1 in the steady lighting period PH1. The length tn1 of the second polarity period P21 in the heating period PH21 may be smaller than the length to of the second polarity period P2 in the steady lighting period PH1. Through the setting in the above-described way, it is possible to prevent the protrusion 541p of the second electrode 93 from being rapidly melted and being deformed, and thus to stably further increase the temperature Hp1 of the second electrode 93 in the heating period PH21.

In the present embodiment, an absolute value of the driving current I of the first polarity period P11 in the heating period PH21 may be greater than an absolute value of the driving current I of the first polarity period P1 of the steady lighting period PH1. According to the configuration, it is possible to further melt the first electrode 92 in the heating period PH21 and thus to further lengthen the inter-electrode distance L. Consequently, it is possible to further minimize the occurrence of a mercury bridge.

In the first polarity period P11 and the second polarity period P21 of the heating period PH21, driving power supplied to the discharge lamp 90 can be made the same. Therefore, there is no time and effort to change driving power supplied to the discharge lamp 90 in the heating period PH21, and this is convenient. Since driving power is not changed in the heating period PH21, it is possible to minimize the occurrence of flickering in the discharge lamp 90.

In the present embodiment, there may be a configuration in which, for example, a capacitor or a battery is incorporated into the circuit configuration of the projector 500, and the driving current I is supplied to the discharge lamp 90 from the capacitor or the battery in the heating period PH21. According to the configuration, for example, even in a case where a method is employed in which the supply of power to the projector 500 is turned off by directly pulling out a plug for supplying power to the projector 500, the heating period PH21 can be provided. In this case, directly pulling out the plug corresponds to a stop operation. The input reception unit 45 receives the stop operation by detecting that the supply of main power is stopped.

In the above description, a value of the driving current I of the second polarity period P21 in the heating period PH21 is −Im2 as a constant value, but the invention is not limited thereto. In the present embodiment, an absolute value of the driving current I of the second polarity period P21 in the heating period PH21 may be changed within a range greater than an absolute value of the driving current I of the second polarity period P2 in the steady lighting period PH1.

In the present embodiment, a plurality of heating periods PH21 may be provided. In this case, after a stop operation is received, the heating period PH21 and the steady lighting period PH1 are alternately repeated. According to the configuration, it is possible to appropriately increase the temperature Hp1 of the second electrode 93 and also to prevent the protrusion 541p of the second electrode 93 from being depleted.

Second Embodiment

A second embodiment is different from the first embodiment in terms of a current waveform.

In the following description, the same constituent elements as in the first embodiment are given the same reference numerals, and description thereof will be omitted in some cases.

Figure 10:
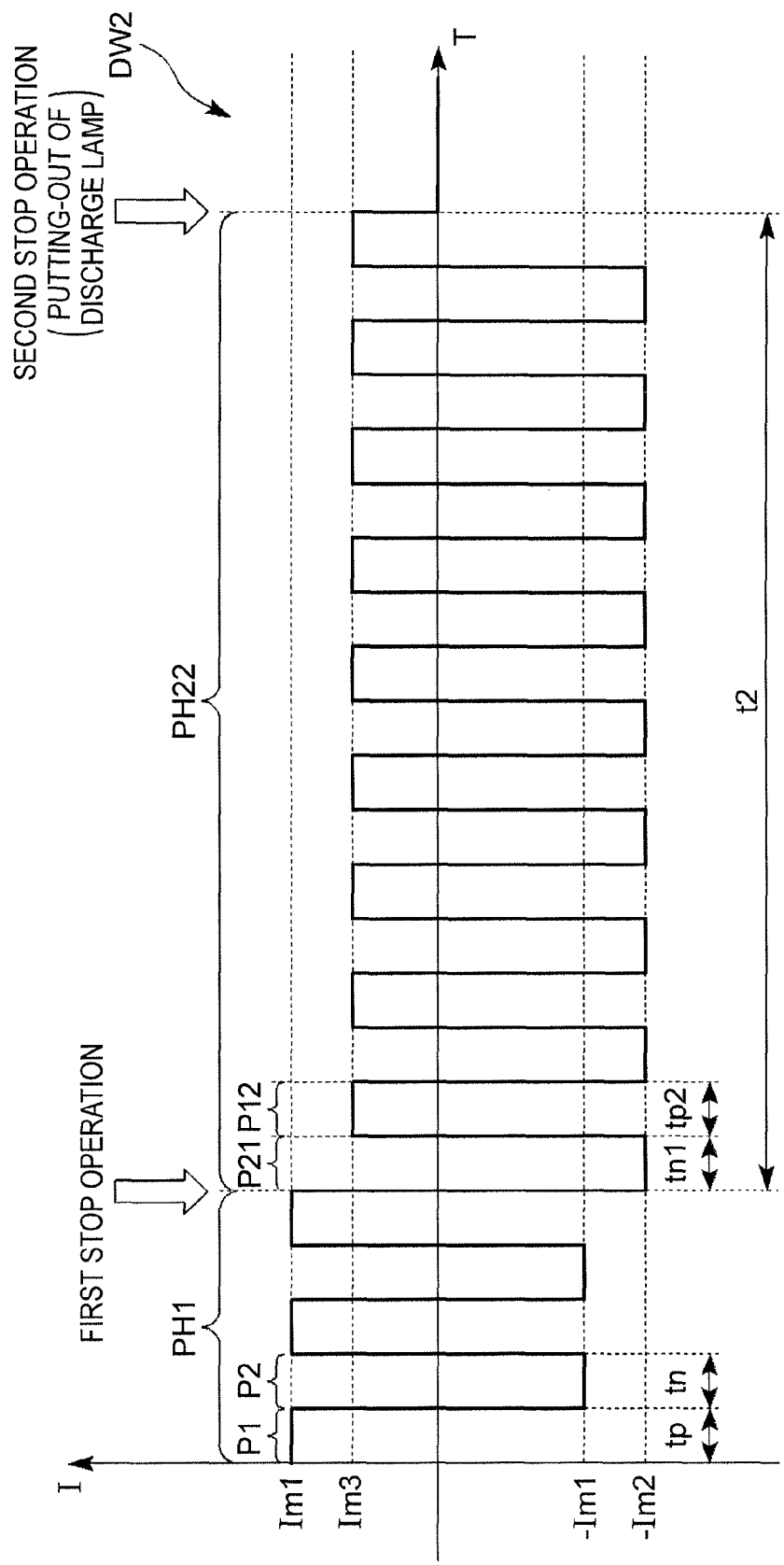
FIG. 10 is a diagram illustrating an example of a driving current waveform according to a second embodiment.

FIG. 10 is a diagram illustrating an example of a driving current waveform DW2 of the present embodiment. FIG. 10 illustrates the driving current waveform DW2 before and after the input reception unit 45 receives a stop operation.

As illustrated in FIG. 10, the driving current waveform DW2 (driving current I) includes the steady lighting period PH1 and a heating period (second AC period) PH22. In the present embodiment, the driving current waveform DW2 transitions from the steady lighting period PH1 to the heating period PH22 when the input reception unit 45 receives the first stop operation.

The heating period PH22 alternately includes a first polarity period P12 in which the first polarity state occurs and the second polarity period P21 in which the second polarity state occurs.

In the present embodiment, a value of the driving current I of the first polarity period P12 is, for example, Im3. An absolute value of Im3 is smaller than an absolute value of Im1. In other words, an absolute value of the driving current I of the first polarity period P12 in the heating period PH22 is smaller than an absolute value of the driving current I of the first polarity period P1 in the steady lighting period PH1.

In the present embodiment, for example, a difference between an absolute value of Im1 and an absolute value of Im3 is the same as a difference between an absolute value of −Im2 and an absolute value of −Im1. In other words, a decrease amount of driving power of the first polarity period P12 relative to driving power of the first polarity period P1 is the same as an increase amount of driving power of the second polarity period P21 relative to driving power of the second polarity period P2. Consequently, a mean value of driving power supplied to the discharge lamp 90 in the heating period PH22 is the same as a value of driving power supplied to the discharge lamp 90 in the steady lighting period PH1.

A length tp2 of the first polarity period P12 may be set to be the same as the length tp1 of the first polarity period P11 of the first embodiment.

A length t2 of the heating period PH22 may be set to be the same as the length t1 of the heating period PH21 of the first embodiment.

Configurations other than the above description are the same as the configurations of the first embodiment.

According to the present embodiment, an absolute value of the driving current I of the first polarity period P12 in the heating period PH22 is smaller than an absolute value of the driving current I of the first polarity period P1 in the steady lighting period PH1. For this reason, a value of mean driving power in the heating period PH22 can be made close to a value of driving power in the steady lighting period PH1. Consequently, it is possible to minimize the occurrence of flickering in the discharge lamp 90 when a period in which an alternating current is supplied to the discharge lamp 90 transitions from the steady lighting period PH1 to the heating period PH22.

According to the present embodiment, a mean value of driving power supplied to the discharge lamp 90 in the heating period PH22 is the same as a value of driving power supplied to the discharge lamp 90 in the steady lighting period PH1. Consequently, it is possible to further minimize the occurrence of flickering in the discharge lamp 90 when a period in which an alternating current is supplied to the discharge lamp 90 transitions from the steady lighting period PH1 to the heating period PH22.

In the present embodiment, the following configurations and methods may be employed.

In the present embodiment, a difference between an absolute value of Im1 and an absolute value of Im3 may be different from a difference between an absolute value of −Im2 and an absolute value of −Im1. In other words, a mean value of driving power supplied to the discharge lamp 90 in the heating period PH22 may be different from a value of driving power supplied to the discharge lamp 90 in the steady lighting period PH1.

In the present embodiment, a value of the driving current I of the first polarity period P12 in the heating period PH22 may be changed.

Third Embodiment

A third embodiment is different from the first embodiment in that a length of a second polarity period is larger than a length of a first polarity period in a heating period. In the following description, the same constituent elements as in the first embodiment are given the same reference numerals, and description thereof will be omitted in some cases.

Figure 11:
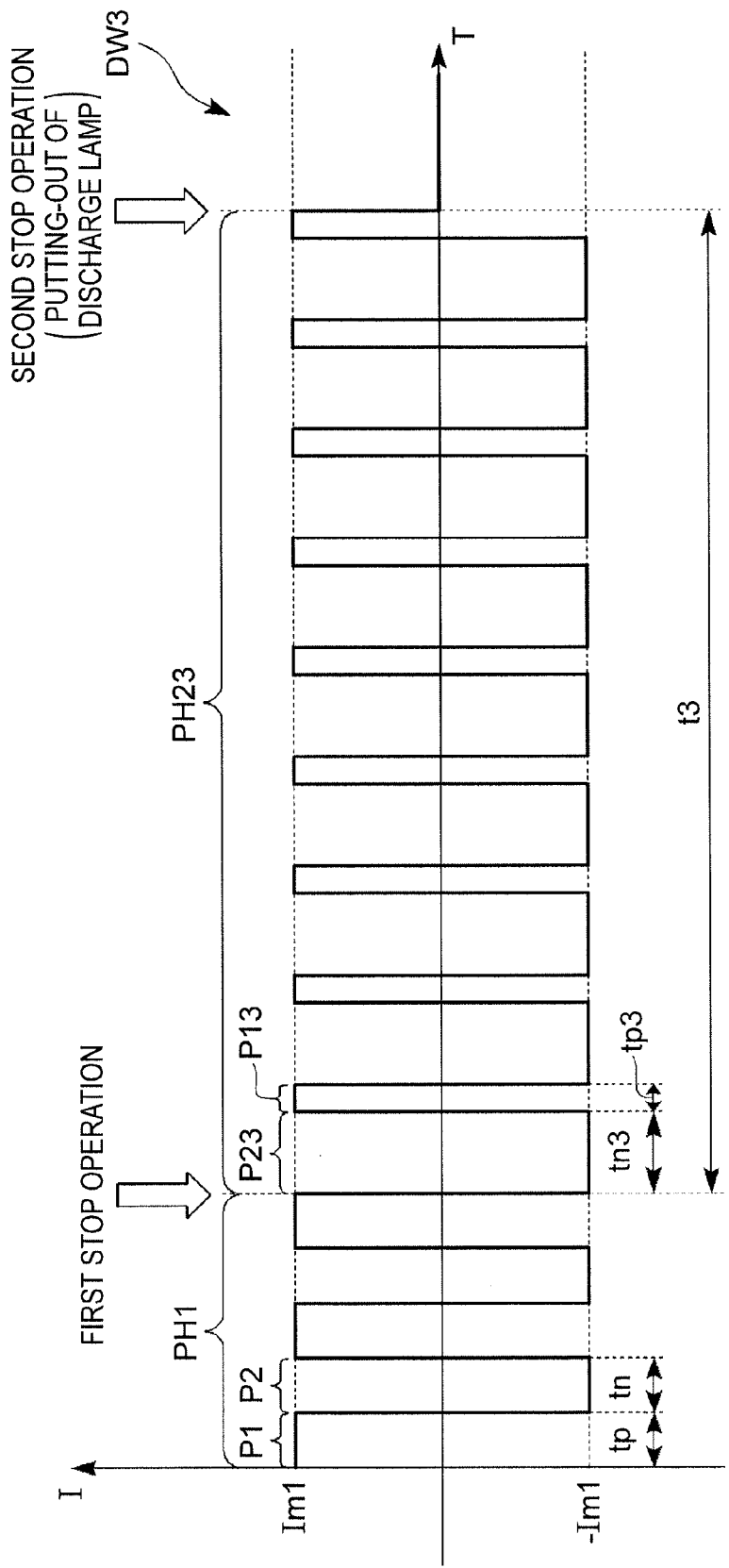
FIG. 11 is a diagram illustrating an example of a driving current waveform according to a third embodiment.

FIG. 11 is a diagram illustrating an example of a driving current waveform DW3 of the present embodiment. FIG. 11 illustrates the driving current waveform DW3 before and after the input reception unit 45 receives a stop operation.

As illustrated in FIG. 11, the driving current waveform DW3 includes the steady lighting period PH1 and a heating period PH23 in which an alternating current is supplied to the discharge lamp 90. In the present embodiment, the driving current waveform DW3 transitions from the steady lighting period PH1 to the heating period PH23 when the input reception unit 45 receives the first stop operation.

In the present embodiment, the heating period PH23 is entirely provided after the input reception unit 45 receives the first stop operation until receiving the second stop operation. In other words, a length t3 of the heating period PH23 corresponds to a time period after a user performs the first stop operation until performing the second stop operation.

The heating period PH23 alternately includes a first polarity period P13 in which the first polarity state occurs and a second polarity period P23 in which the second polarity state occurs. In other words, in the heating period PH23, an alternating current is supplied to the discharge lamp 90.

A value of the driving current I of the first polarity period P13 is Im1. In other words, the value of the driving current I of the first polarity period P13 is the same as a value of the driving current I of the first polarity period P1 in the steady lighting period PH1.

A value of the driving current I of the second polarity period P23 is −Im1. In other words, the value of the driving current I of the second polarity period P23 is the same as a value of the driving current I of the second polarity period P2 in the steady lighting period PH1.

A value of driving power in the steady lighting period PH1 is the same as a value of driving power in the heating period PH23.

A length tn3 of the second polarity period P23 in the heating period PH23 is larger than a length tp3 of the first polarity period P13 in the heating period PH23. Here, in the example illustrated in FIG. 11, a frequency of the driving current I in the heating period PH23 is the same as a frequency in the steady lighting period PH1. In other words, a duty ratio of the second polarity period P23 is higher in the heating period PH23 than in the steady lighting period PH1.

A ratio of the length tn3 of the second polarity period P23 in the heating period PH23 to the length tp3 of the first polarity period P13 in the heating period PH23 may be, for example, 3 or more and 9 or less. In other words, a duty ratio of the second polarity period P23 in the heating period PH23 may be, for example, 0.75 or more and 0.9 or less. Since the length tn3 of the second polarity period P23 in the heating period PH23 is set in the above-described way, it is possible to appropriately heat the second electrode 93 and also to prevent the second electrode 93 from being depleted.

Other configurations of the heating period PH23 may be the same as the configurations of the heating period PH21 of the first embodiment.

The control device 40 controls the discharge lamp driving unit 230 according to the above-described driving current waveform DW3.

The above-described embodiment may be expressed as a control method for the projector. In other words, a control method for the projector of the present embodiment includes causing the discharge lamp 90 to emit light; causing the main reflection mirror 112 to reflect the light emitted from the discharge lamp 90 in the irradiation direction D; and causing the input reception unit 45 to receive a predetermined operation, in which the discharge lamp 90 includes the discharge lamp main body 510 having the discharge space 91 therein, and the first electrode 92 and the second electrode 93 protruding in the discharge space 91, in which the main reflection mirror 112 is attached to the first end 90e1 of the discharge lamp main body 510, the first electrode 92 is disposed on the first end 90e1 side, and the second electrode 93 is disposed on the second end 90e2 side of the discharge lamp main body 510 on an opposite side to the first end 90e1, in which the driving current I includes the steady lighting period PH1 and the heating period PH23 in which an alternating current is supplied to the discharge lamp 90, in which the steady lighting period PH1 and the heating period PH23 alternately include the first polarity periods P1 and P13 in which the first electrode 92 serves as an anode and the second polarity periods P2 and P23 in which the second electrode 93 serves as the anode, in which, in a case where the input reception unit 45 receives a stop operation on the projector, a period in which an alternating current is supplied to the discharge lamp 90 transitions from the steady lighting period PH1 to the heating period PH23, and in which the length tn3 of the second polarity period P23 in the heating period PH23 becomes larger than the length tp3 of the first polarity period P13 in the heating period PH23.

According to the present embodiment, the driving current waveform DW3 includes the heating period PH23. In the heating period PH23, the length tn3 of the second polarity period P23 is larger than the length tp3 of the first polarity period P13. For this reason, in the heating period PH23, the temperature Hp1 of the second electrode 93 which is heated more than in the steady lighting period PH1 becomes higher. Consequently, according to the present embodiment, in the same manner as in the first embodiment, it is possible to provide the projector having a configuration capable of minimizing a mercury bridge and of minimizing deterioration in convenience.

In the present embodiment, a frequency of the driving current I in the heating period PH23 may be higher than a frequency of the driving current I in the steady lighting period PH1. According to the configuration, the second electrode 93 is likely to be gradually heated, and it is possible to prevent the protrusion 541p of the second electrode 93 from being melted away due to a steep heat load. The frequency of the driving current I in the heating period PH23 is preferably equal to or higher than, for example, 500 Hz and is equal to or lower than 1 kHz. Through the setting in the above-described way, it is possible to prevent a steep heat load from being applied to the second electrode 93 and also to increase the temperature Hp1 of the second electrode 93 relatively fast.

As described in the first to third embodiments, in an aspect of the invention, configurations and methods thereof are not particularly limited as long as the temperature Hp1 of the second electrode 93 can be made higher by increasing a heat load applied to the second electrode 93 in the heating period. In other words, an absolute value of the driving current I supplied to the discharge lamp 90 in the second polarity period may be great as in the first embodiment and the second embodiment, and the length of the second polarity period may be large as in the third embodiment.

In the first to third embodiments, a description has been made of an example of a case where the invention is applied to the transmissive projector, but the invention is applicable to a reflective projector. Here, the term "transmissive" indicates a type in which a liquid crystal light valve including a liquid crystal panel or the like transmits light therethrough. The term "reflective" indicates a type in which the liquid crystal light valve reflects light. A light modulation device is not limited to a liquid crystal panel or the like, and may be a light modulation device using, for example, a micro-mirror.

In the first to third embodiments, a description has been made of an example of the projector 500 using the three liquid crystal panels 560R, 560G and 560B (the liquid crystal light valves 330R, 330G and 330B), but the invention is applicable to a projector using only a single liquid crystal panel, and to a projector using four or more liquid crystal panels.

The configurations of the first to third embodiments may be combined with each other as appropriate so as not to cause contradiction therebetween.

What is claimed is:
1. A projector comprising:
a discharge lamp configured to emit light;
a reflection mirror configured to reflect the light emitted from the discharge lamp in a predetermined direction;
a discharge lamp driving unit configured to supply a driving current to the discharge lamp;
a controller configured to control the discharge lamp driving unit;
an input reception unit configured to receive a predetermined operation;
a light modulation device configured to modulate the light emitted from the discharge lamp according to an image signal; and
a projection optical device configured to project light modulated by the light modulation device,
wherein the discharge lamp includes a discharge lamp main body that has a discharge space therein, and a first electrode and a second electrode that protrude in the discharge space,
wherein the reflection mirror is attached to a first end of the discharge lamp main body,
wherein the first electrode is disposed on the first end side,
wherein the second electrode is disposed on a second end side of the discharge lamp main body opposite to the first end,
wherein the driving current includes a first AC period and a second AC period in which an alternating current is supplied to the discharge lamp,
wherein each of the first AC period and the second AC period alternately includes a first polarity period in which the first electrode serves as an anode and a second polarity period in which the second electrode serves as an anode,
wherein, in a case where the input reception unit receives a stop operation on the projector, the controller causes a period in which an alternating current is supplied to the discharge lamp to transition from the first AC period to the second AC period, and
wherein an absolute value of the driving current of the second polarity period in the second AC period is greater than an absolute value of the driving current of the second polarity period in the first AC period.

2. The projector according to claim 1,
wherein the absolute value of the driving current of the second polarity period in the second AC period is 0.8 times or greater and 1.25 times or smaller than an absolute value of the driving current obtained when rating power is supplied to the discharge lamp.

3. The projector according to claim 1,
wherein an absolute value of the driving current of the first polarity period in the second AC period is smaller than an absolute value of the driving current of the first polarity period in the first AC period.

4. The projector according to claim 3,
wherein a mean value of driving power supplied to the discharge lamp in the second AC period is the same as a value of driving power supplied to the discharge lamp in the first AC period.

5. A projector comprising:
a discharge lamp configured to emit light;
a reflection mirror configured to reflect the light emitted from the discharge lamp in a predetermined direction;
a discharge lamp driving unit configured to supple a driving current to the discharge lamp;
a controller configured to control the discharge lamp driving unit;
an input reception unit configured to receive a predetermined operation;
a light modulation device configured to modulate the light emitted from the discharge lamp according to an image signal; and
a projection optical device configured to project light modulated by the light modulation device,
wherein the discharge lamp includes a discharge lamp main body that has a discharge space therein, and a first electrode and a second electrode that protrude in the discharge space,
wherein the reflection mirror is attached to a first end of the discharge lamp main body,
wherein the first electrode is disposed on the first end side,
wherein the second electrode is disposed on a second end side of the discharge lamp main body opposite to the first end,
wherein the driving current includes a first AC period and a second AC period in which an alternating current is supplied to the discharge lamp,
wherein each of the first AC period and the second AC period alternately includes a first polarity period in which the first electrode serves as an anode and a second polarity period in which the second electrode serves as an anode,
wherein, in a case where the input reception unit receives a stop operation on the projector, the controller causes a period in which an alternating current is supplied to the discharge lamp to transition from the first AC period to the second AC period, and
wherein a length of the second polarity period in the second AC period is larger than a length of the first polarity period in the second AC period.

6. The projector according to claim 1,
wherein the length of the second AC period is 5.0 ms or more and 10 s or less.

7. The projector according to claim 5,
wherein the length of the second AC period is 5.0 ms or more and 10 s or less.

8. The projector according to claim 1,
wherein the stop operation includes a first stop operation and a second stop operation which is performed temporally later than the first stop operation, and
wherein the second AC period is provided in at least a partial period between the first stop operation and the second stop operation.

9. The projector according to claim 5,
wherein the stop operation includes a first stop operation and a second stop operation which is performed temporally later than the first stop operation, and
wherein the second AC period is provided in at least a partial period between the first stop operation and the second stop operation.

10. The projector according to claim 8,
wherein, in a case where the input reception unit receives the first stop operation, the controller performs a checking operation for checking whether or not operation stoppage of the projector is necessary.

11. The projector according to claim 9,
wherein, in a case where the input reception unit receives the first stop operation, the controller performs a checking operation for checking whether or not operation stoppage of the projector is necessary.

12. The projector according to claim 8,
wherein, in a case where the input reception unit receives the second stop operation, the controller controls the discharge lamp driving unit to stop the supply of the driving current to the discharge lamp.

13. The projector according to claim 9,
wherein, in a case where the input reception unit receives the second stop operation, the controller controls the discharge lamp driving unit to stop the supply of the driving current to the discharge lamp.

14. The projector according to claim 1, further comprising:
a cooling unit configured to cool the discharge lamp, wherein the controller
in the first AC period, drives the cooling unit with a first output which is set according to driving power supplied to the discharge lamp, and
in at least a part of the second AC period, drives the cooling unit with a second output which is more than the first output.

15. The projector according to claim 5, further comprising:
a cooling unit configured to cool the discharge lamp, wherein the controller
in the first AC period, drives the cooling unit with a first output which is set according to driving power supplied to the discharge lamp, and
in at least a part of the second AC period, drives the cooling unit with a second output which is more than the first output.

16. The projector according to claim 1, further comprising:
a cooling unit configured to cool the reflection mirror, wherein the controller
in the first AC period, drives the cooling unit with a first output which is set according to driving power supplied to the discharge lamp, and
in at least a part of the second AC period, drives the cooling unit with a second output which is more than the first output.

17. The projector according to claim 5, further comprising:
a cooling unit configured to cool the reflection mirror, wherein the controller
in the first AC period, drives the cooling unit with a first output which is set according to driving power supplied to the discharge lamp, and
in at least a part of the second AC period, drives the cooling unit with a second output which is more than the first output.

18. The projector according to claim 1,
wherein a frequency of the driving current in the second AC period is higher than a frequency of the driving current in the first AC period.

19. The projector according to claim 5,
wherein a frequency of the driving current in the second AC period is higher than a frequency of the driving current in the first AC period.

20. A control method for a projector including a discharge lamp configured to emit light, a reflection mirror configured to reflect the light emitted from the discharge lamp, and an input reception unit configured to receive a predetermined operation,
the discharge lamp having a discharge lamp main body that has a discharge space therein, and a first electrode and a second electrode that protrude in the discharge space,
the reflection mirror being attached to a first end of the discharge lamp main body,
the first electrode being disposed on the first end side, and the second electrode being disposed on a second end side of the discharge lamp main body opposite to the first end, the control method comprising:
supplying a driving current including a first AC period and a second AC period in which an alternating current is supplied to the discharge lamp and which alternately include a first polarity period in which the first electrode serves as an anode and a second polarity period in which the second electrode serves as an anode respectively, and
performing transition of a period in which an alternating current is supplied to the discharge lamp from the first AC period to the second AC period, in a case where the input reception unit receives a stop operation on the projector,
wherein an absolute value of the driving current of the second polarity period in the second AC period is greater than an absolute value of the driving current of the second polarity period in the first AC period.

* * * * *